United States Patent
Plourde et al.

(10) Patent No.: US 9,383,068 B2
(45) Date of Patent: *Jul. 5, 2016

(54) LED LIGHT ASSEMBLY AND SYSTEM

(71) Applicant: DIOLUCE, LLC, New Britian, CT (US)

(72) Inventors: Roger Plourde, Woodbury, CT (US); Hae N. Yi, Woodbury, CT (US); Byoung K. Shin, Incheon (KR)

(73) Assignee: Dioluce, LLC, Woodbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,564

(22) Filed: Dec. 12, 2013

(65) Prior Publication Data

US 2014/0175988 A1 Jun. 26, 2014

Related U.S. Application Data

(60) Provisional application No. 61/864,256, filed on Aug. 9, 2013, provisional application No. 61/736,317, filed on Dec. 12, 2012.

(51) Int. Cl.
| | |
|---|---|
| H05B 37/02 | (2006.01) |
| H05B 33/08 | (2006.01) |
| F21K 99/00 | (2016.01) |

(52) U.S. Cl.
CPC .............. *F21K 9/17* (2013.01); *H05B 33/0803* (2013.01); *H05B 33/0854* (2013.01); *H05B 37/0218* (2013.01); *H05B 37/0227* (2013.01); *Y02B 20/19* (2013.01); *Y02B 20/383* (2013.01)

(58) Field of Classification Search
CPC ................................ H05B 37/02; G01R 31/00
USPC .................... 315/152; 324/403; 362/227–253
See application file for complete search history.

(56) References Cited

U.S. PATENT DOCUMENTS

| | | | | |
|---|---|---|---|---|
| 3,506,959 | A * | 4/1970 | Nunn | 340/908.1 |
| 4,714,219 | A * | 12/1987 | Mayse | 248/65 |
| D374,301 | S | 10/1996 | Kleffman | |
| 5,653,412 | A * | 8/1997 | Martorano et al. | 248/222.11 |
| 6,082,031 | A * | 7/2000 | Heaton et al. | 40/570 |
| 6,231,213 | B1 * | 5/2001 | Schmidt et al. | 362/374 |
| 6,590,343 | B2 * | 7/2003 | Pederson | 315/76 |
| D496,121 | S | 9/2004 | Santoro | |
| 7,014,332 | B2 * | 3/2006 | Sergio et al. | 362/147 |
| D556,358 | S | 11/2007 | Santoro | |
| 7,307,391 | B2 * | 12/2007 | Shan | B60Q 1/2611 315/291 |
| D608,490 | S | 1/2010 | Chung et al. | |
| 7,784,966 | B2 * | 8/2010 | Verfuerth et al. | 362/221 |
| 7,853,414 | B2 * | 12/2010 | Mischel et al. | 702/44 |
| 7,997,770 | B1 * | 8/2011 | Meurer | F21K 9/17 362/171 |

(Continued)

FOREIGN PATENT DOCUMENTS

GB 2479216 A 10/2011

*Primary Examiner* — Douglas W Owens
*Assistant Examiner* — Wei Chan
(74) *Attorney, Agent, or Firm* — Lando & Anastasi, LLP

(57) ABSTRACT

An LED based light assembly and lighting system is disclosed. The lighting system includes at least one light assembly comprising a plurality of LED chips, a controller and a power supply module. The controller is configured to receive an input signal and to provide an output control signal for controlling power to the at least one light assembly. The power supply module is configured to receive a standard voltage and current signal and to provide a power signal to the at least one light assembly to power the at least one light assembly in response to the control signal.

18 Claims, 48 Drawing Sheets

SYSTEM BLOCK DIAGRAM: DIGITAL DIMMABLE LED DRIVE

(56) References Cited

U.S. PATENT DOCUMENTS

| | | | |
|---|---|---|---|
| 8,070,312 B2* | 12/2011 | Verfuerth et al. | 362/217.05 |
| D653,376 S* | 1/2012 | Kong et al. | D26/76 |
| 8,376,583 B2* | 2/2013 | Wang et al. | 362/249.05 |
| D678,597 S | 3/2013 | Lehman et al. | |
| 8,419,209 B2* | 4/2013 | Mai | 362/217.14 |
| D698,975 S | 2/2014 | Blessitt et al. | |
| D703,368 S* | 4/2014 | Oldani | D26/113 |
| 9,052,075 B2 | 6/2015 | Demuynck et al. | |
| 9,206,948 B1 | 12/2015 | Scribante et al. | |
| D747,529 S | 1/2016 | Yoon | |
| D749,768 S | 2/2016 | Snell et al. | |
| 2006/0023450 A1 | 2/2006 | Chung et al. | |
| 2006/0221606 A1* | 10/2006 | Dowling | 362/217 |
| 2006/0255753 A1* | 11/2006 | Sawada et al. | 315/312 |
| 2007/0025110 A1* | 2/2007 | Langlois et al. | 362/427 |
| 2007/0189001 A1* | 8/2007 | Nielson et al. | 362/16 |
| 2007/0247850 A1* | 10/2007 | Hawkins et al. | 362/267 |
| 2010/0079075 A1* | 4/2010 | Son | 315/152 |
| 2010/0102730 A1* | 4/2010 | Simon et al. | 315/152 |
| 2010/0149791 A1* | 6/2010 | McCane et al. | 362/147 |
| 2010/0176724 A1* | 7/2010 | Neal et al. | 315/36 |
| 2011/0058372 A1* | 3/2011 | Lerman et al. | 362/235 |
| 2011/0221350 A1* | 9/2011 | Staab | H05B 37/0218 315/154 |
| 2012/0020112 A1* | 1/2012 | Fisher et al. | 362/608 |
| 2012/0044435 A1* | 2/2012 | Dai | 349/58 |
| 2012/0069582 A1* | 3/2012 | Chang | 362/371 |
| 2012/0146503 A1* | 6/2012 | Negley et al. | 315/35 |
| 2012/0242929 A1* | 9/2012 | Ohyama | 349/61 |
| 2012/0287631 A1* | 11/2012 | Sheng | 362/235 |
| 2012/0300471 A1* | 11/2012 | Howe | 362/328 |
| 2012/0306377 A1* | 12/2012 | Igaki | F21V 23/0464 315/151 |
| 2013/0003373 A1* | 1/2013 | Hamby et al. | 362/249.02 |
| 2013/0128177 A1* | 5/2013 | Kuo et al. | 349/58 |
| 2013/0208212 A1* | 8/2013 | Que et al. | 349/61 |
| 2014/0009940 A1* | 1/2014 | Moore | 362/249.07 |
| 2014/0168955 A1* | 6/2014 | Gershaw | 362/147 |
| 2014/0313716 A1* | 10/2014 | Lang | H01L 35/30 362/235 |

* cited by examiner

SYSTEM BLOCK DIAGRAM: DIGITAL DIMMABLE LED DRIVE

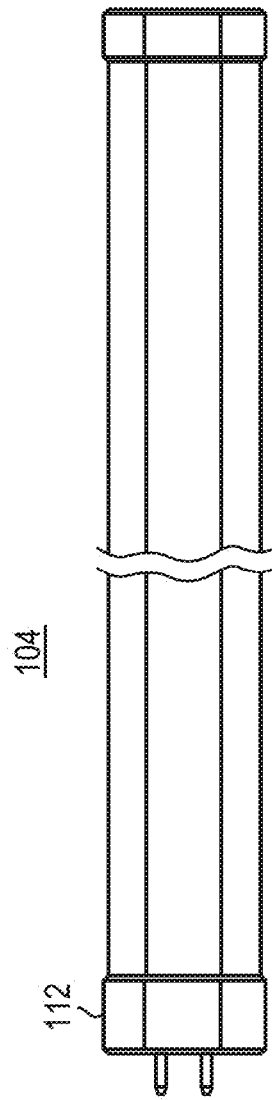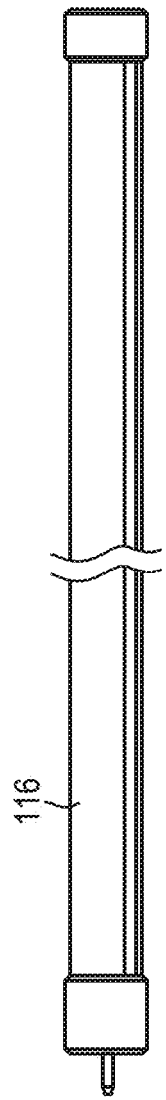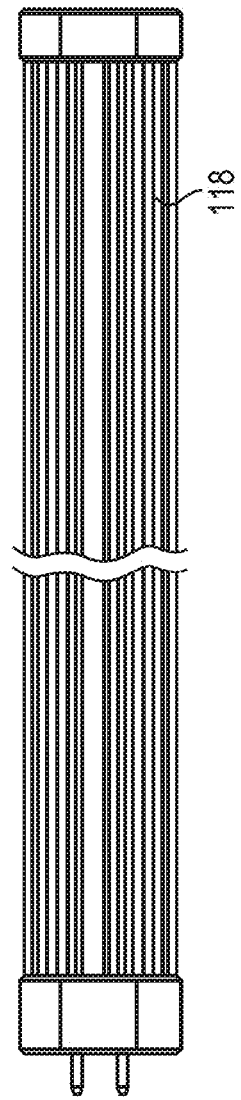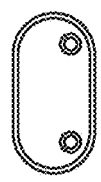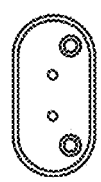

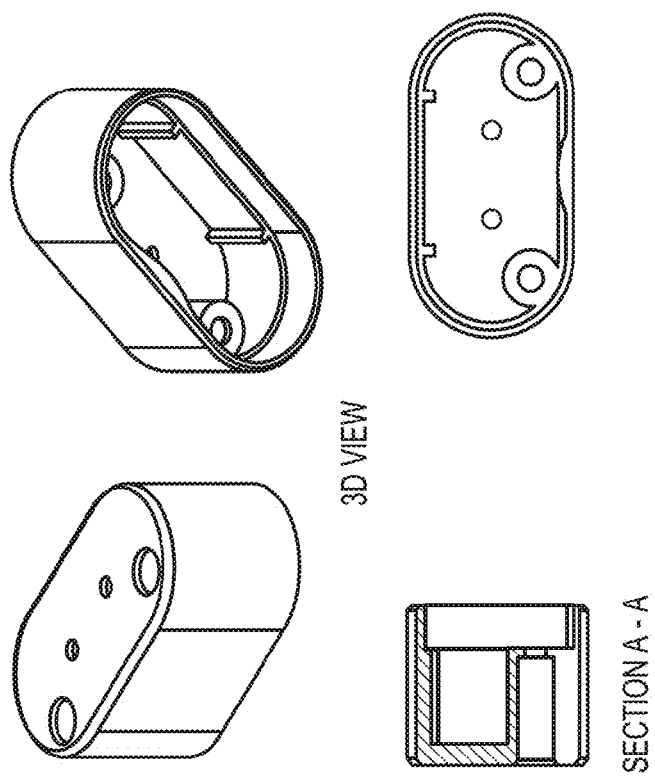
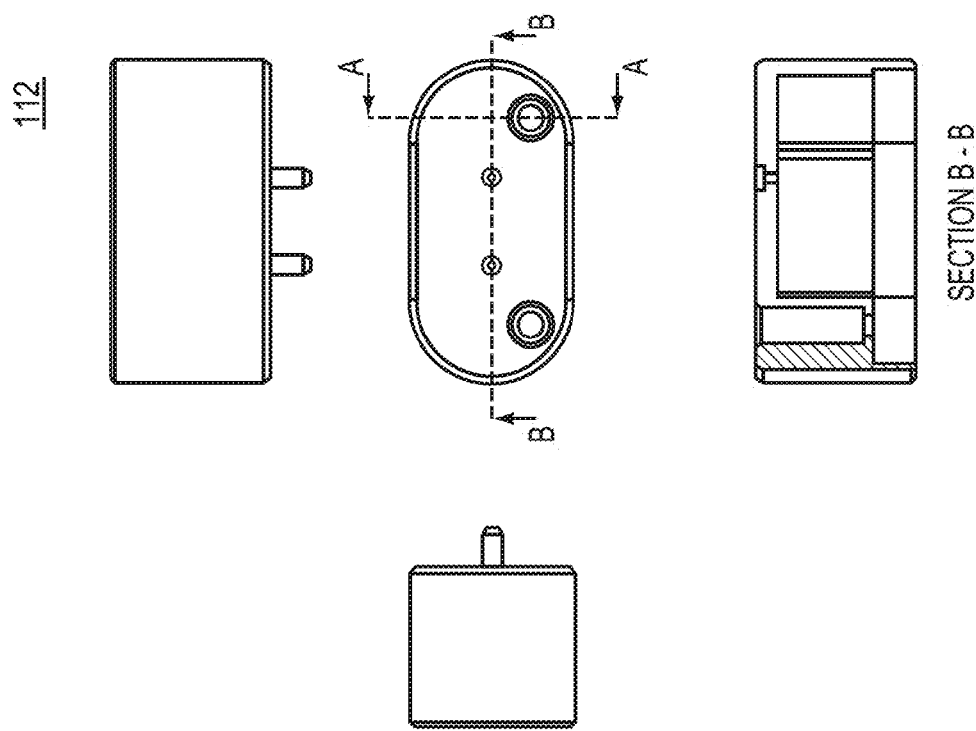
FIG. 6

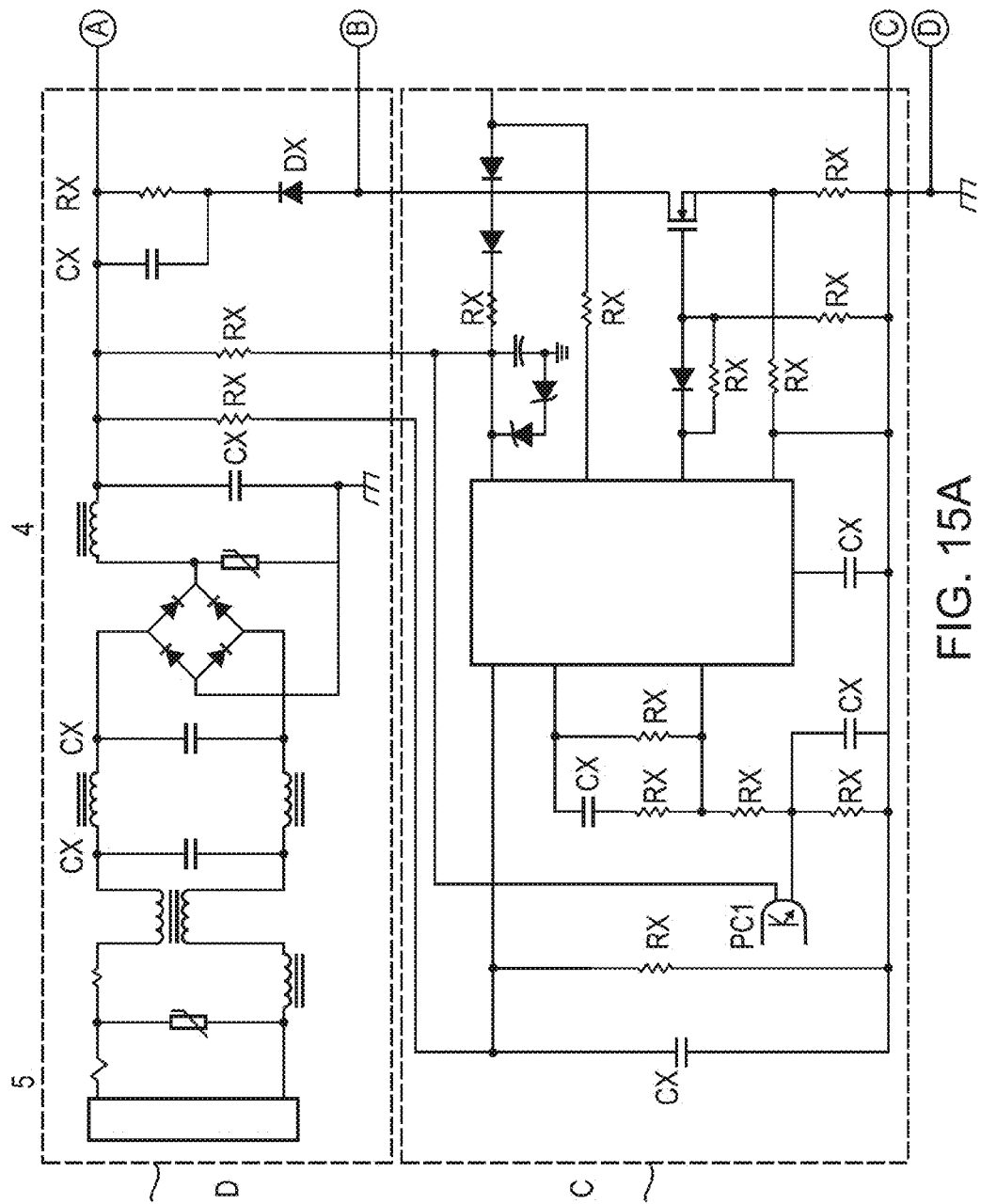
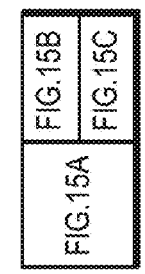

| SWITCH<br>LIGHT | SW1 | SW2 | SW3 | XXX |
|---|---|---|---|---|
| 550mA | 1 | 0 | 0 | CDS_H |
| 500mA | 0 | 1 | 0 | CDS_M |
| 450mA | 0 | 0 | 1 | CDS_L |
| 550mA | 1 | 1 | 0 | HD_H |
| 500mA | 0 | 1 | 1 | HD_M |
| 450mA | 1 | 0 | 1 | HD_L |
| 550mA | 1 | 1 | 1 | MAX LOAD |
| 250mA | 0 | 0 | 0 | MIN LOAD |

SWITCH MANUAL
-. SWITCH DOWN : H
-. SWITCH UP : L 2710, 2712, 2714, 2716, 2718, 2720, 2722, 2724

FIG. 24

LED LIGHT ASSEMBLY AND SYSTEM

BACKGROUND

Overhead light fixtures used in parking garages, office space, industrial warehouses, and the like often include fluorescent light bulbs or lamps, and typically include 3 fluorescent light bulbs. Some disadvantages of fluorescent light bulbs or lamps that are used in such fixtures are that they are not very efficient and thus consume a lot of power. For example, such fluorescent light bulbs or lamps are not very amenable to being dimmed and when they are dimmed their power factor or efficiency drops down to about 70%. In addition, fluorescent light bulbs may not provide enough light for certain fixture locations. Further, fluorescent light bulbs have an omni-directional light output pattern, not directional, and thus there is inherent loss of light radiated in a backwards direction (upwards instead of downwards). Further, fluorescent light bulbs become less efficient over time and use, and are not suitable for use in certain applications such as cold weather locations. Still further, fluorescent light bulbs tend to give off a large amount of heat, which can lead to increased air conditioning costs when used in high temperature locations and climates.

SUMMARY OF INVENTION

Aspects and embodiments are directed to a replacement light assembly for use in fixtures that currently use fluorescent light bulbs or lamps. Aspects and embodiments are further directed to replacement lighting systems for use in applications that currently use fluorescent light fixtures. In particular, aspects and embodiments of the light assembly disclosed herein can be used to replace existing 2-foot, 4-foot, 8-foot or any length tubular fluorescent light bulbs. Further, aspects and embodiments of the lighting system systems disclosed herein can be configured to retro-fit existing overhead light fixtures or can be provided as new light fixtures. Further, aspects and embodiments of the light assembly and lighting systems disclosed herein can be configured to replace any type of fluorescent light bulb or lamp. Further, aspects and embodiments of the light assembly and lighting system disclosed herein provide for using less light assemblies than fluorescent bulbs currently used in existing fixtures, while providing more efficient, longer-life, and cooler (less heat being generated) lighting.

Various aspects and embodiments of an LED based light assembly and lighting system are disclosed. One embodiment of a lighting system includes at least one light assembly comprising a plurality of LED chips, a controller and a power supply module. The controller is configured to receive an input signal and to provide an output control signal for controlling power to the at least one light assembly. The power supply module is configured to receive a standard voltage and current signal and to provide a power signal to the at least one light assembly to power the at least one light assembly in response to the control signal.

Another embodiment of a lighting system includes at least one light assembly comprising a plurality of LED chips, a controller configured to receive an input signal and to provide an output control signal for controlling power to the at least one light assembly, and a power supply module configured to receive a standard voltage and current signal, to convert the standard voltage and current signal to a DC voltage signal for powering the controller and to provide a power signal to the at least one light assembly to power the at least one light assembly in response to the control signal.

The various embodiments of the lighting system can further comprise a multi-setting switch that provides a respective switch output signal for each setting of the switch, wherein the controller is responsive to switch output signal and is configured to provide the control signal to control the power level provided by the at least one light assembly in response to the setting of the multi-setting switch.

The various embodiments of the lighting system can further comprise an ambient light sensor that senses an amount of ambient light and provides an ambient light sensor output signal as a function of an amount of sensed ambient light, wherein the controller is also responsive to the ambient light sensor output signal and is configured to provide the control signal to control the light level provided by the at least one light assembly in response to an amount of sensed ambient light.

The various embodiments of the lighting system can further comprise a motion sensor that senses motion and provides a motion sensor output signal, wherein the controller is also responsive to the motion sensor output signal and is configured to provide the control signal to control the light level provided by the at least one light assembly in response to sensed motion.

According to aspects of the various embodiments of the lighting system, the at least one light assembly is sized and configured to be replacement for a standard fluorescent light bulb.

According to aspects of the various embodiments of the lighting system, the at least one light assembly comprises a circuit board housing a plurality of LED chips arranged in at least one row, wherein the circuit board is configured so as to dispose the plurality of LED chips in a spaced apart relationship so as to keep the LED chips below a maximum operating temperature. According to aspects of the light assembly, the circuit board is laid out so to provide for a high level of heat dissipation. According to aspects of the light assembly, the light assembly further comprises a base having a plurality of arms that define ridges along the length of the base to receive the circuit board. According to aspects of the light assembly, the light assembly further comprises further comprises at least one end cap that comprises two connectors that are configured and arranged to mate with a standard fluorescent light bulb fixture. According to aspects of the various embodiments of the lighting system, lighting system further comprises an overdraft protection circuit that limits a peak amount of current that can be provided between the two pins of the end cap.

According to aspects of the various embodiments of the lighting system, the power supply comprises a stable voltage and current maintenance circuit that that limit the maximum current and voltage to be provided to the at last one light assembly.

According to aspects of the various embodiments of the lighting system, the at least one light assembly further comprises a cover having ridges running along a length of the cover so as to disperse the light provided by the plurality of LED chips along a width of the cover and the light assembly.

According to aspects of the various embodiments of the lighting system, the lighting system is sized and arranged to be a replacement for a standard overhead fluorescent light fixture.

According to aspects of the various embodiments of the lighting system, the lighting system comprises at least two light assemblies. According to aspects of the various embodiments of the lighting system, the lighting system further comprises a cover that covers that at least two light assemblies, wherein the cover has ridges running along a length of the cover so as to disperse the light provided by at least two light assemblies along a width of the cover and along a width of the lighting system. According to aspects of the various embodiments of the lighting system, the lighting system further comprises two rods that maintain the cover in place over the by at least two light assemblies. According to aspects of the various embodiments of the lighting system, the lighting system further comprises a reflective background having ridges to reflect the light provided by the at least two light assemblies.

According to aspects of the various embodiments of the lighting system, the lighting system further comprises a frame for the lighting system having a plurality of slots in two ends of the frame; a plurality of bracket pins, each shaped and arranged to be pushed through slots in the frame and into an end of a base of the light assembly.

According to aspects of the various embodiments of the lighting system, the lighting system further comprises a respective hanging bracket and two clips for each of the two ends of the frame of the lighting system that are constructed and arranged to allow for easy installation and removal of each end of the frame of the lighting system from a casing for the lighting system.

According to aspects of the various embodiments of the lighting system, the lighting system further comprises a plurality of clamps that maintain the cover to a base of the lighting system.

An LED based lighting system, comprises at least one light assembly comprising a plurality of LED chips; a controller configured to receive an input signal and to provide an output control signal for controlling power to the at least one light assembly; and a power supply module configured to receive a standard voltage and current signal, to convert the standard voltage and current signal to a DC voltage signal for powering the controller and to provide a power signal to the at least one light assembly to power the at least one light assembly in response to the control signal.

The LED based lighting system as disclosed in any embodiment herein, can further comprise a multi-setting switch that provides a respective switch output signal for each setting of the switch, wherein the controller is responsive to switch output signal and is configured to provide the control signal to control the power level provided by the at least one light assembly in response to the setting of the multi-setting switch.

The LED based lighting system as disclosed in any embodiment herein, can further comprise a ambient light sensor that senses an amount of ambient light and provides an ambient light sensor output signal as a function of an amount of sensed ambient light, wherein the controller is also responsive to the ambient light sensor output signal and is configured to provide the control signal to control the light level provided by the at least one light assembly in response to an amount of sensed ambient light.

The LED based lighting system as disclosed in any embodiment herein, can further comprise a motion sensor that senses motion and provides a motion sensor output signal, wherein the controller is also responsive to the motion sensor output signal and is configured to provide the control signal to control the light level provided by the at least one light assembly in response to sensed motion.

The LED based lighting system as disclosed in any embodiment herein, wherein the at least one light assembly is sized and configured to be replacement for a standard fluorescent light bulb.

The LED based lighting system as disclosed in any embodiment herein, wherein the at least one light assembly comprises a circuit board housing a plurality of LED chips arranged in at least one row, wherein the circuit board is configured so as to dispose the plurality of LED chips in a spaced apart relationship so as to keep the LED chips below a maximum operating temperature.

The LED based lighting system as disclosed in any embodiment herein, wherein the circuit board is laid out so to provide for a high level of heat dissipation.

The LED based lighting system as disclosed in any embodiment herein, wherein the at least one light assembly is further comprises a base having a plurality of arms that define ridges along the length of the base to receive the circuit board.

The LED based lighting system as disclosed in any embodiment herein, wherein the at least one light assembly further comprises at least one end cap that comprises two connectors that are configured and arranged to mate with a standard fluorescent light bulb fixture.

The LED based lighting system as disclosed in any embodiment herein, can further include an overdraft protection circuit that limits peak amount of current that can be provided between the two pins of the end cap.

The LED based lighting system as disclosed in any embodiment herein, wherein the power supply comprises a stable voltage and current maintenance circuit that that limit the maximum current and voltage to be provided to the at last one light assembly.

The LED based lighting system as disclosed in any embodiment herein, wherein the at least one light assembly further comprises a cover having ridges running along a length of the cover so as to disperse the light provided by the plurality of LED chips along a width of the cover and the light assembly.

The LED based lighting system as disclosed in any embodiment herein, wherein the lighting system is sized and arranged to be a replacement for a standard overhead fluorescent light fixture.

The LED based lighting system as disclosed in any embodiment herein, wherein the lighting system comprises at least two light assemblies.

The LED based lighting system as disclosed in any embodiment herein, can further comprise a cover that covers that at least two light assemblies, wherein the cover has ridges running along a length of the cover so as to disperse the light provided by at least two light assemblies along a width of the cover and along a width of the lighting system.

The LED based lighting system as disclosed in any embodiment herein, can further comprise two rods that maintain the cover in place over the by at least two light assemblies.

The LED based lighting system as disclosed in any embodiment herein, can further comprise a reflective background having ridges to reflect the light provided by the at least two light assemblies.

The LED based lighting system as disclosed in any embodiment herein, can further comprise a frame for the lighting system having a plurality of slots in two ends of the frame and a plurality of bracket pins, each bracket pin being shaped and arranged to be pushed through corresponding slots in the frame and into an end of a base of the light assembly.

The LED based lighting system as disclosed in any embodiment herein, can further comprise a respective hanging bracket and two clips for each of the two ends of the frame of the lighting system that are constructed and arranged to allow for easy installation and removal of each end of the frame of the lighting system from a casing for the lighting system.

The LED based lighting system as disclosed in any embodiment herein, can further comprise a plurality of clamps that maintain the cover to a base of the lighting system.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIGS. 4A-4E are mechanical drawings of the lighting assembly 104;

FIG. 6 is a mechanical drawing of an end cap of the light assembly according to this disclosure;

FIG. 24 illustrates a table of switch settings for the lighting assembly according to this disclosure;

DETAILED DESCRIPTION

Aspects and embodiments are directed to a replacement light assembly for use in fixtures that currently use fluorescent light bulbs or lamps. Aspects and embodiments are further directed to replacement lighting systems for use in applications that currently use fluorescent light fixtures. In particular, aspects and embodiments of the light assembly disclosed herein can be used to replace existing 2-foot, 4-foot, 8-foot or any length tubular fluorescent light bulbs. Further, aspects and embodiments of the lighting system systems disclosed herein can be configured to retro-fit existing overhead light fixtures or can be provided as new light fixtures. Further, aspects and embodiments of the light assembly and lighting systems disclosed herein can be configured to replace any type of fluorescent light bulb or lamp. Further, aspects and embodiments of the light assembly and lighting system disclosed herein provide for using less light assemblies than fluorescent bulbs currently used in existing fixtures, while providing more efficient, longer-life, and cooler (less heat being generated) lighting.

It is to be understood that the term light bulb and lamp are used interchangeably herein. It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
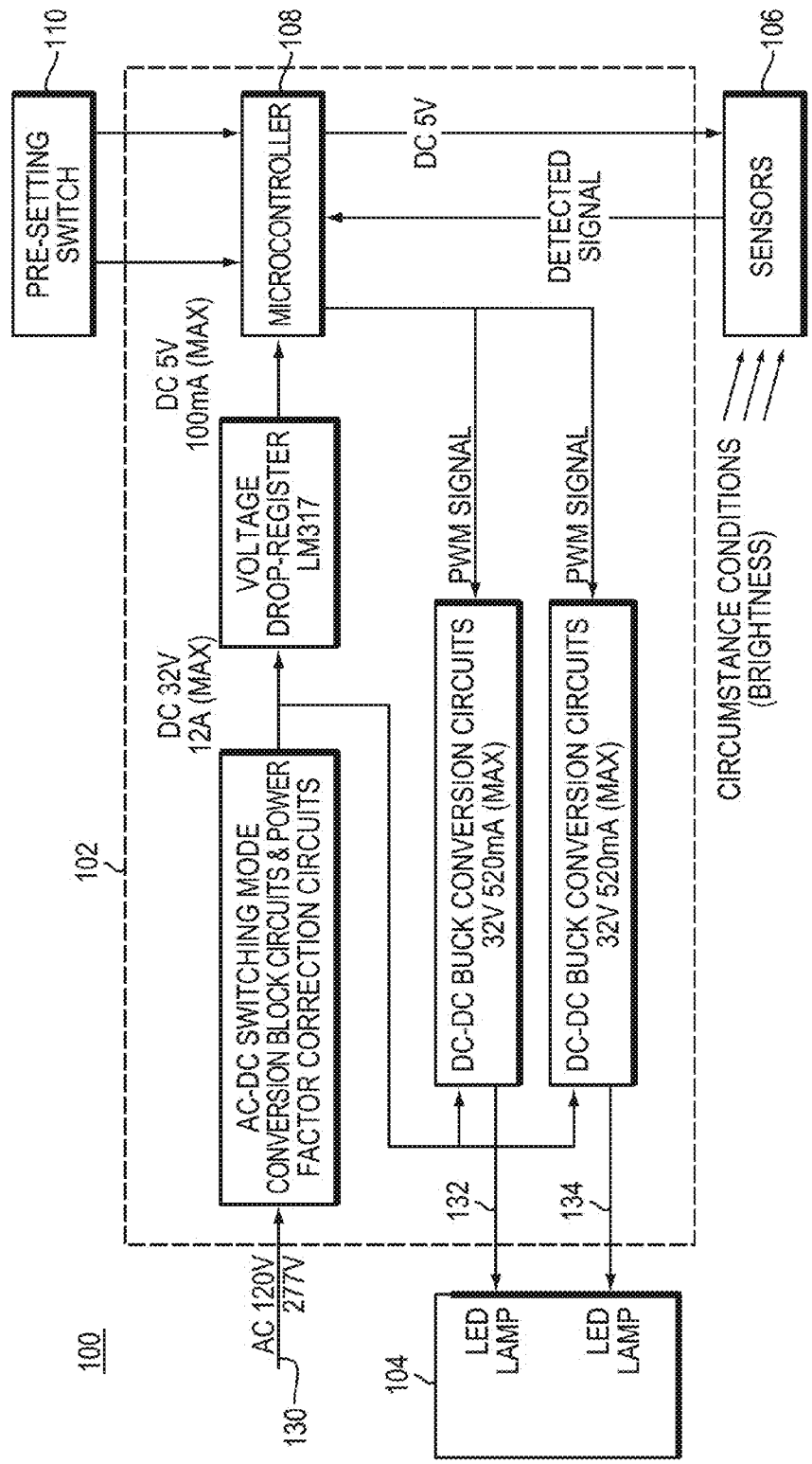
FIG. 1 is a schematic diagram of a lighting system according to the disclosure.

FIG. 1 is a schematic diagram of an embodiment of a lighting system 100 according to the disclosure. The lighting system includes a power supply module 102 that receives an input voltage, such as for example a standard 110-220 Volts AC or any other standard input voltage and current, and converts the standard input voltage and current to DC output voltage for powering a light assembly 104, ambient light and motion sensors 106, and a microcontroller 108. The lighting system also includes a multiple position switch 110, which can be for example a DIP switch having at least 3 switches.

The power supply module 102 receives, for example, a 120 Volts AC input signal on input line 130 and converts the input voltage to two parallel output DC voltage signals on lines 132, 134 to power two LED bulbs or lamps 104. The power supply module converts the input voltage and current to a DC voltage and current for powering the microcontroller 108. The power supply module can also include the microcontroller 108, which is configured to be responsive to the switch 110 settings to provide an output signal on lines 132, 134 that adjust the amount of light output by the LED light assemblies 104. The sensor circuit 106 includes a motion sensor circuit that detects motion to provide for turning on the LED light assemblies 104 in response to the detected motion. The sensor circuit also includes an ambient light sensor circuit, which outputs a signal corresponding to an amount of detected ambient light. The microcontroller 108 in combination with the motion sensor of sensors 106 combine to provide an output signal that turns on the LED light assemblies 104 in response to motion detected by the motion sensor. In addition, the microcontroller 108 in combination with the ambient light sensor of sensors 106 combine to provide an output signal that adjusts the amount of light output by LED light assemblies 104. For example, if no ambient light is detected by the light sensor 144, then the light assemblies can provide a maximum light output. Alternatively, if a sufficient amount of ambient light is detected, such as may occur in daylight, then LED light assemblies can be controlled, for example to only provide half of the light capacity of the LED light bulbs or lamps.

Figure 2:
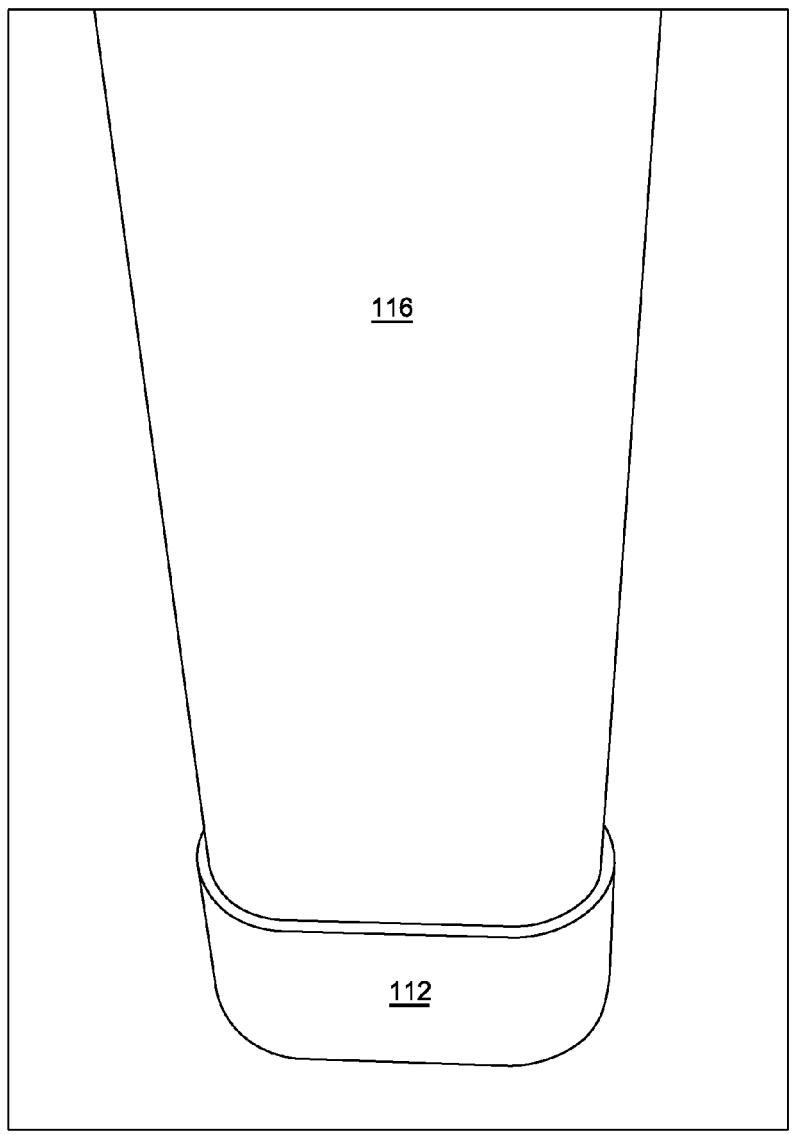
FIG. 2 is a top view of a lighting assembly according to the disclosure.
Figure 3:
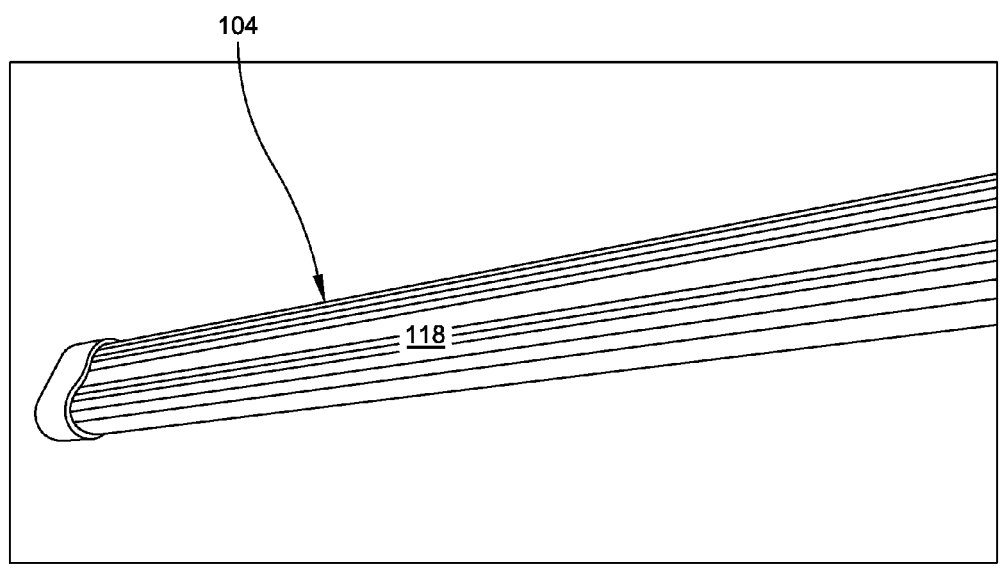
FIG. 3 is a bottom view of the lighting assembly according to the disclosure.

FIG. 2 is a photo of a top view of a portion of one embodiment of the lighting assembly 104 according to the disclosure. The lighting assembly 104 includes a cover 116 and an end cap 112 that mates the lighting assembly 104 to existing lighting fixtures for fluorescent light bulbs. FIG. 3 is a photo of a bottom view of one embodiment the lighting assembly 104 according to the disclosure. The lighting assembly includes a base 118. FIGS. 4A-4E are a mechanical drawings of the lighting assembly 104 including top view 4A, side view 4B, bottom view 4C of the lighting assembly 104, and FIGS. 4D and 4E are end views of an end cap 112.

Figure 5:
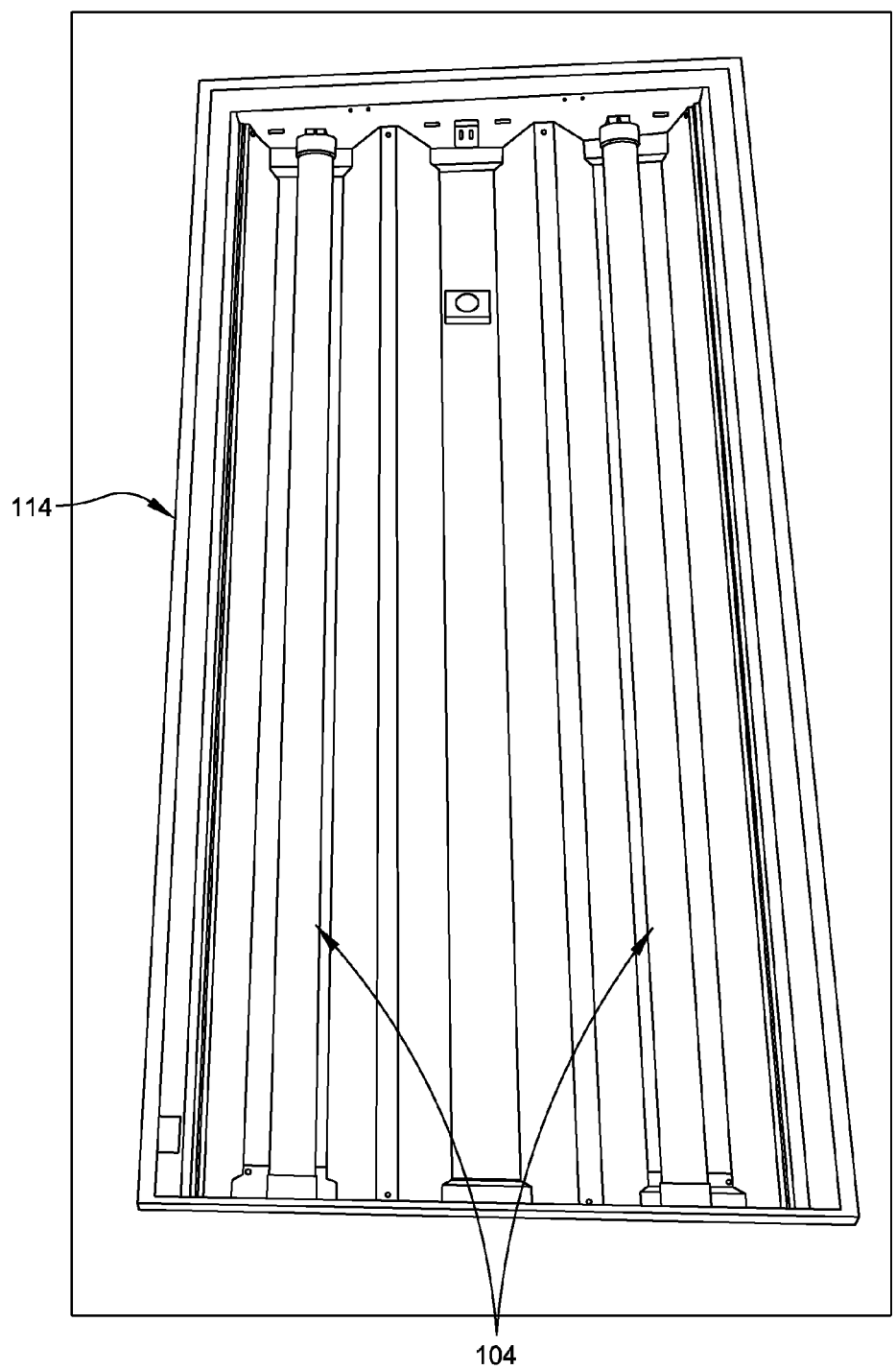
FIG. 5 illustrates a lighting fixture retrofitted with two lighting assemblies LED light assemblies mounted in the fixture.

As noted above, the lighting assembly 104 can be used as a replacement lighting assembly in existing fixtures that use fluorescent light bulbs. Alternatively, as will be detailed with respect to some embodiments of the disclosure, the lighting system and lighting assemblies can be provided as a completely new fixture that can, for example, replace an existing lighting fixture or to retrofit an existing lighting fixture. FIG. 5 illustrates an existing lighting fixture 114 typically used with fluorescent light bulbs that has been retrofitted with two lighting assemblies 104 (herein also called LED light bulbs or lamps) mounted in the fixture 114. Although not seen in the photo, the lighting fixture has also been retrofitted to include the power supply module (not shown) so as to power the lighting assemblies 104. It is to be appreciated that lighting fixture 114 can also optionally be retrofitted with the multi-setting switch 110 and the sensor 106. The lighting assemblies 104 can be used to replace existing 2-foot, 4-foot. 8-foot or any other length tubular fluorescent light bulbs and are configured to mate with existing light fixture 114 connections for fluorescent light bulbs through end caps 112, and in at least one embodiment disclosed herein, to be powered through one end cap, as will be discussed herein. FIG. 6 is a mechanical drawing of one embodiment of the end cap 112. Thus, an existing light fixture 114 can be retrofitted with al east the power supply module 102 and the light assemblies 104 can be plugged into standard fluorescent light bulb sockets (now powered by power supply module 102) so as to convert a fluorescent light bulb fixture to an LED lighting system according to this disclosure.

Figure 7:
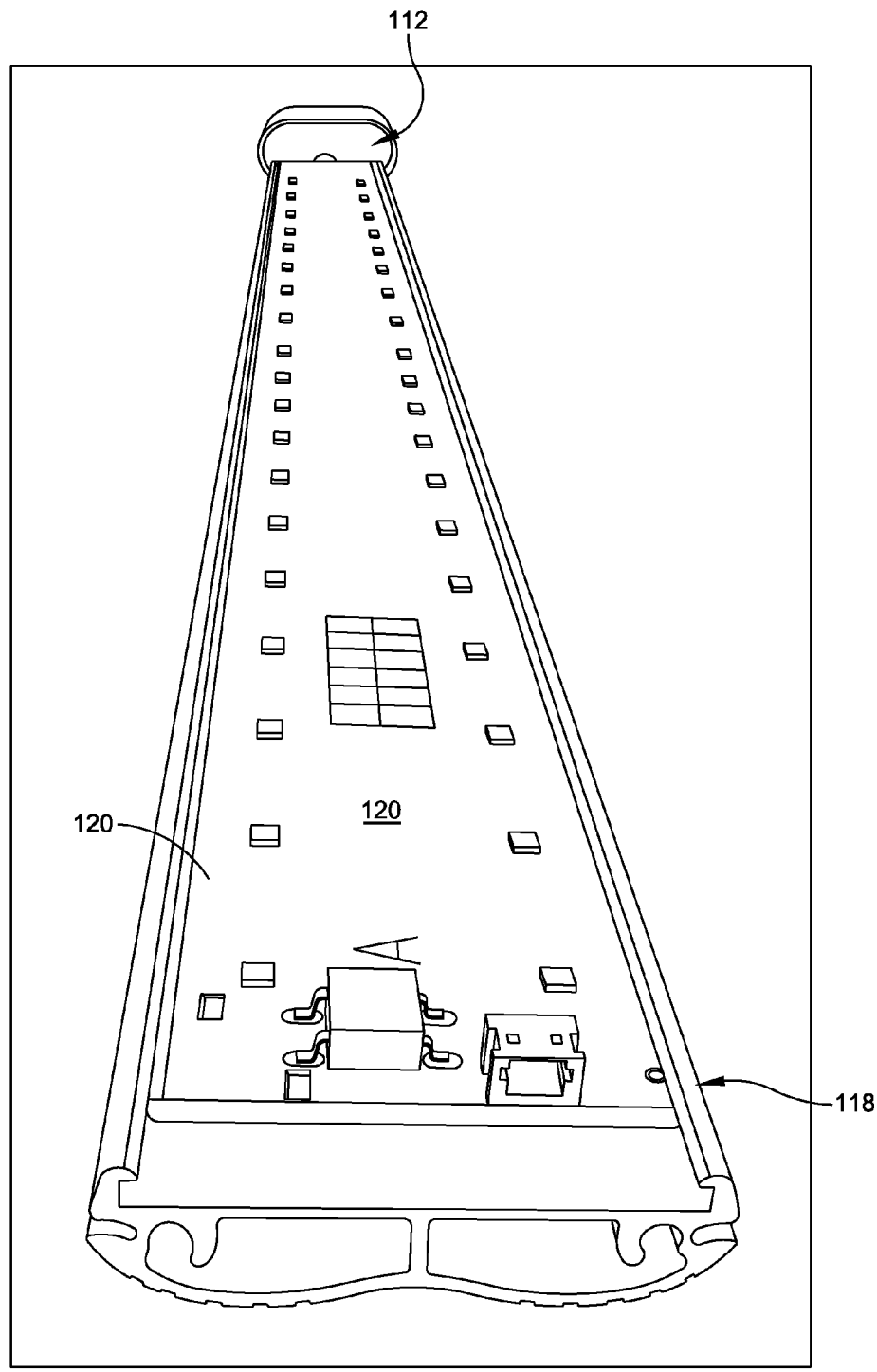
FIG. 7 is a perspective view of an LED light bulb without its cover, according to this disclosure.
Figure 8:
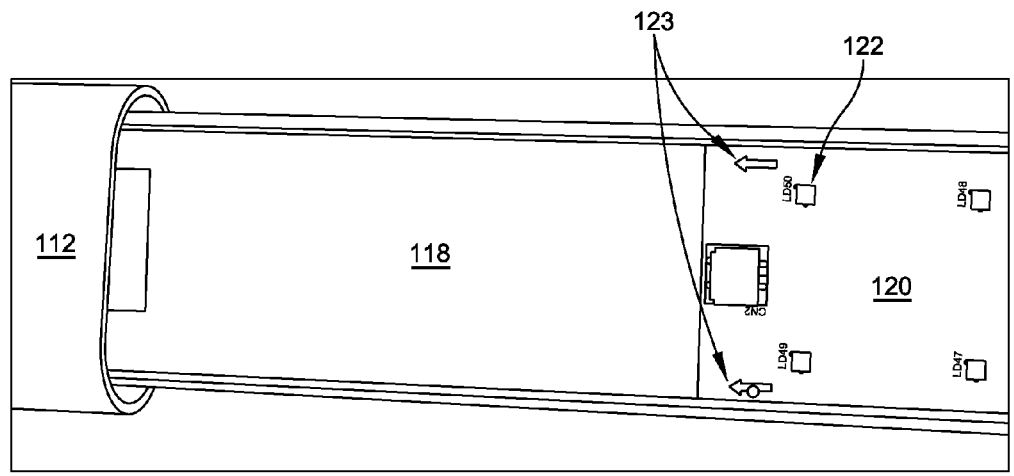
FIG. 8 illustrates a multi-layer board including a plurality of LED chips slid into engagement with a base, according to this disclosure.
Figure 9:
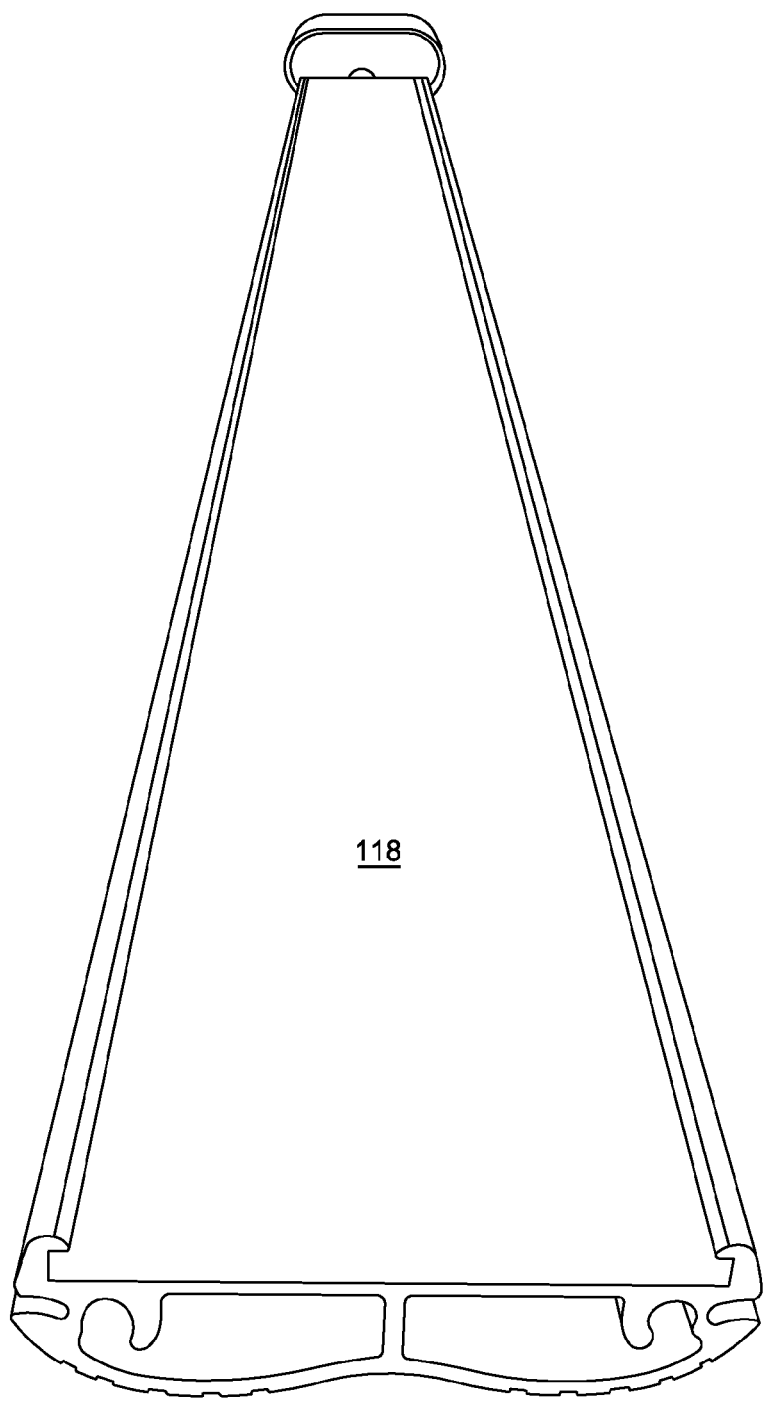
FIG. 9 is a perspective view of a top of a base according to this disclosure.
Figure 10:
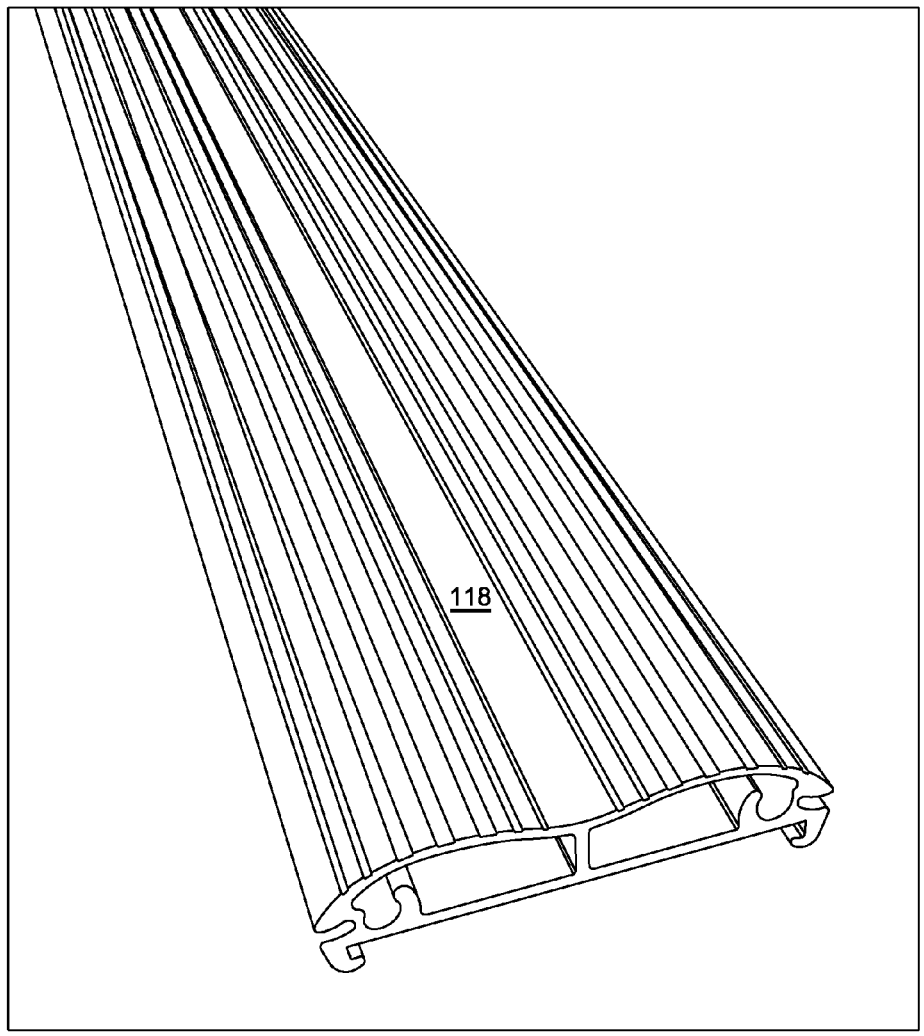
FIG. 10 is a perspective view of a bottom of the base according to this disclosure.
Figure 11:
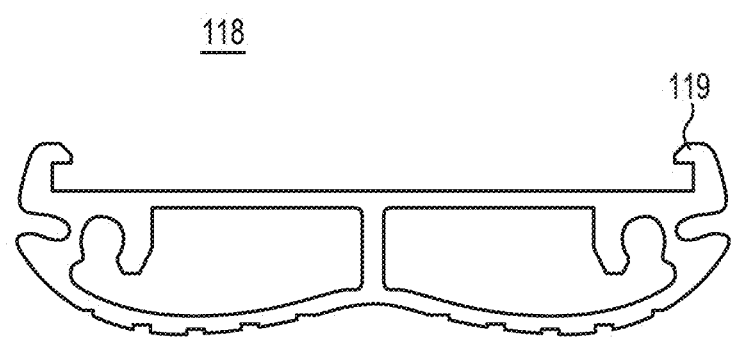
FIG. 11 is a mechanical drawing of the base according to this disclosure.

FIG. 7 is a photo of perspective view of an LED light assembly 104 without one of its end caps 112 and without its cover 116. The LED light assembly 104 includes the base 118 and a multi-layer circuit board 120 that holds a plurality of LED chips 122. FIG. 8 is a photo of a top view of the multi-layer circuit board 120 including the plurality of LED chips 122, which can be slid into engagement with the base 118 along the direction of the arrows 123. FIG. 9 is a photo of a perspective view of the base 118. FIG. 10 is a photo of a perspective view of a bottom of the base 118. And FIG. 11 is a mechanical drawing of the base 118. As can be seen in FIGS. 9-11, the base 118 includes arms 119 configured to receive the multilayer circuit board 120, which can be slid into engagement with the base 118 starting at the end of the base 118.

Referring again to FIG. 7, the multi-layer board 120 includes a plurality of LED chips 122. In the illustrated embodiment there are two parallel traces of LED chips 122 spaced apart along a length of the board so that there are two rows of LED chips that make up a 2-foot long section of the multi-layer circuit board. According to one embodiment, each row of LED chips that make up the 2 foot long multi-layer circuit board can include 25 LED chips. These 2 foot long multi-layer boards can be combined in series within varying length bases to make up LED light assemblies that are 2-foot long, 4-foot long, 8-foot long or any multiple of 2-feet, along with respective 2-foot long, 4-foot long and 8-foot long or any multiple of 2-feet long bases 118 and covers 116, to yield 2-foot long, 4-foot long, 8-foot long or any multiple of 2-feet long LED light assemblies. It is also to be appreciated that the multi-layer boards, bases, and covers can be any length to provide any length lighting assemblies.

Figure 12:
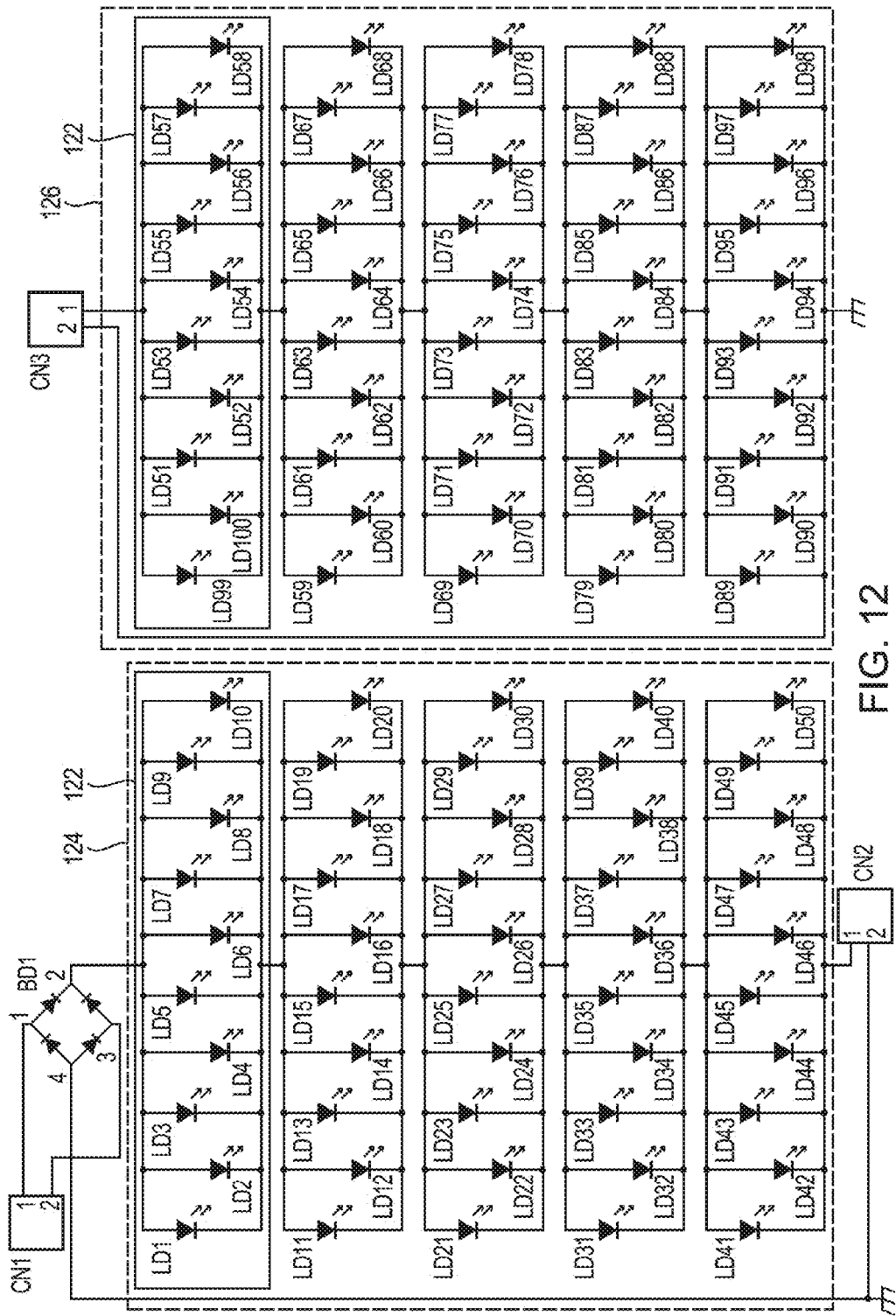
FIG. 12 is a schematic diagram of on embodiment two LED arrays according to this disclosure.
Figure 13:
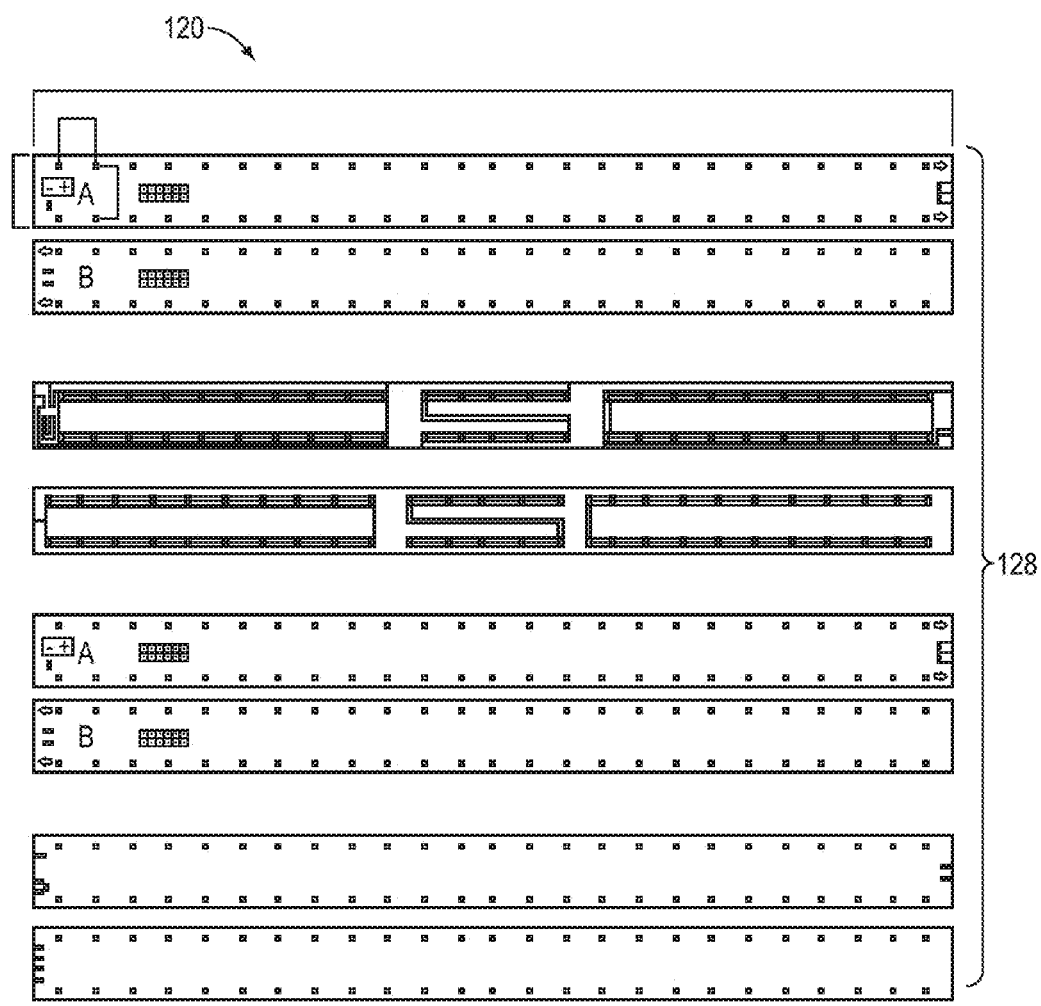
FIG. 13 is a rendering of the layers of the multi-layer board according to this disclosure.

FIG. 12 is a schematic diagram of one embodiment of two LED arrays 124, 126 including a plurality of LED chips 122 that are housed by a multi-layer circuit board 120. It is to be appreciated that each LED chip 122 includes a plurality of LED devices. It is also to be appreciated that each trace can include any number of LED chips 122 and 5 LED chips 122 are illustrated for exemplary purposes only. FIG. 13 is a CAD/CAM rendering of a plurality of layers 128 of the multi-layer board circuit 120. It can be seen from the photo of FIG. 7 and from the multi-layer circuit board layout of FIG. 13 that the LED chips 122 are spaced apart along the length of the multi-layer circuit board 120. According to aspects of this embodiment of the light assembly 104, the spacing of the LED chips 122 and the layout of the multiple layers of the multi-layer circuit board 128 have been configured to maximize the amount of conductors on the layers of the board for dissipating heat, so that the LED chips 122 remain cool during operation. In particular, in one embodiment, it is desirable to keep the LED chips below a temperature of no more than 42 degrees C. With this arrangement of the multi-layer board and spacing of the LED chips 122, it has been tested and verified that the LED chips are running at or below a temperature of 41.6 degrees C. As a result of the spacing of the LED chips and the layout of the multi-layer circuit board, it has been tested and verified that the Luminous Efficiency of the LED light assembly 104 is at least 105 LM/Watt. Contrast this with other LED light bulbs or lamps in the state of the art that run at much higher temperatures and that have a much lower Luminous Efficiency. Because the LED light assembly of the disclosure runs below a temperature of 41.6 degrees C., it as an advantage that the light assembly of the disclosure has a much longer lifetime (lasts a lot longer) than LED bulbs or lamps that run at a higher temperatures. In particular, the applicants have designed the LED light assembly 104 to take advantage of the natural properties of LED chips 122 that run below a temperature of 41.6 degrees C. or lower. Another advantage of the LED light assembly 104 according to this disclosure is that the assembly is configured to take advantage of the fact that the LED chips 122 provide a directed light output (they are not omni-directional) and thus the LED light bulbs or lamps have a highly directional light output of at least 105 LM/Watt. Still another advantage of the LED light assembly 104 according to the disclosure is that the LED light assembly does get hot, even after prolonged use, they remain cool to the touch. This also saves on energy as the light assemblies 104 do not radiate heat, and thus there are reduced air conditioning costs when using the LED light assemblies and the lighting systems in air conditioned locations and climates.

Figure 14:
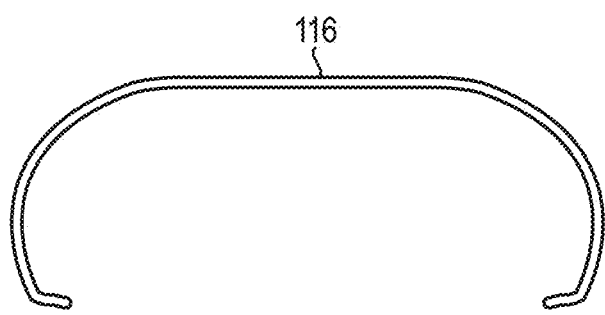
FIG. 14 is a mechanical drawing of the cover of the LED bulb according to this disclosure.
Figure 33:
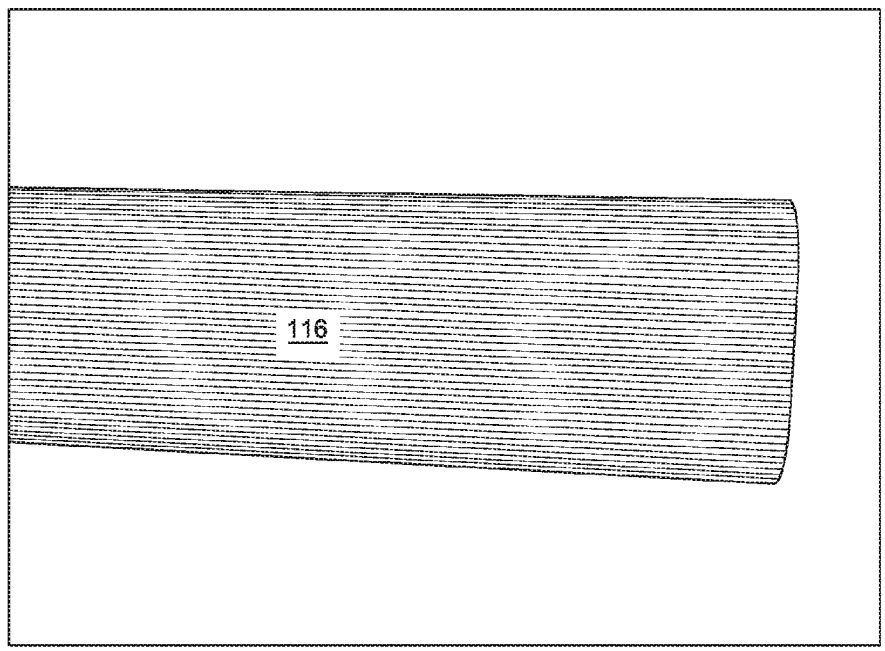
FIG. 33 is a photo of a cover for the light assembly having corrugations of this second embodiment.

FIG. 14 is a mechanical drawing of the cover 116 of the LED light assembly 104 (see FIG. 2 for a perspective view of the cover). FIG. 33 illustrates another embodiment of the cover 116 that covers the individual light assemblies 104. The cover illustrated in FIG. 2 is white and is to some degree translucent and to some degree opaque to light emitted by the plurality of LED chips 122 of the parallel LED arrays 124, 126. However, it is also to be appreciated that the cover can also be clear as illustrated in FIG. 33, translucent, or colored. It is also to be appreciated that the cover 116 can be provided with corrugations along the length of the cover as illustrated in FIG. 33 that result in disbursement of light from the light assemblies 104 along the width of the light assembly and cover (as shown in FIG. 33).

Figure 15B:
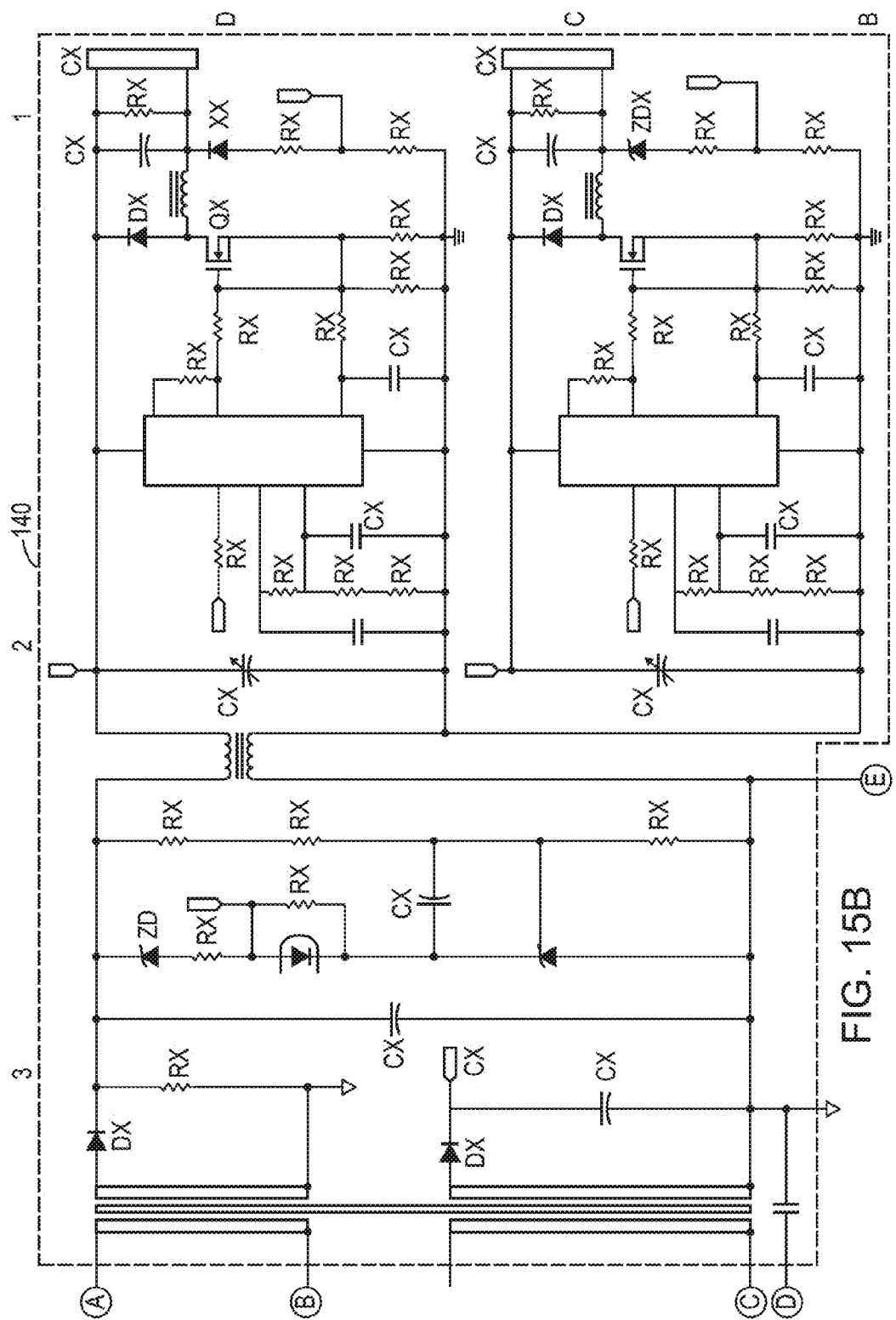
FIG. 15 is a schematic view of one embodiment of a power supply according to the disclosure.
Figure 15C:
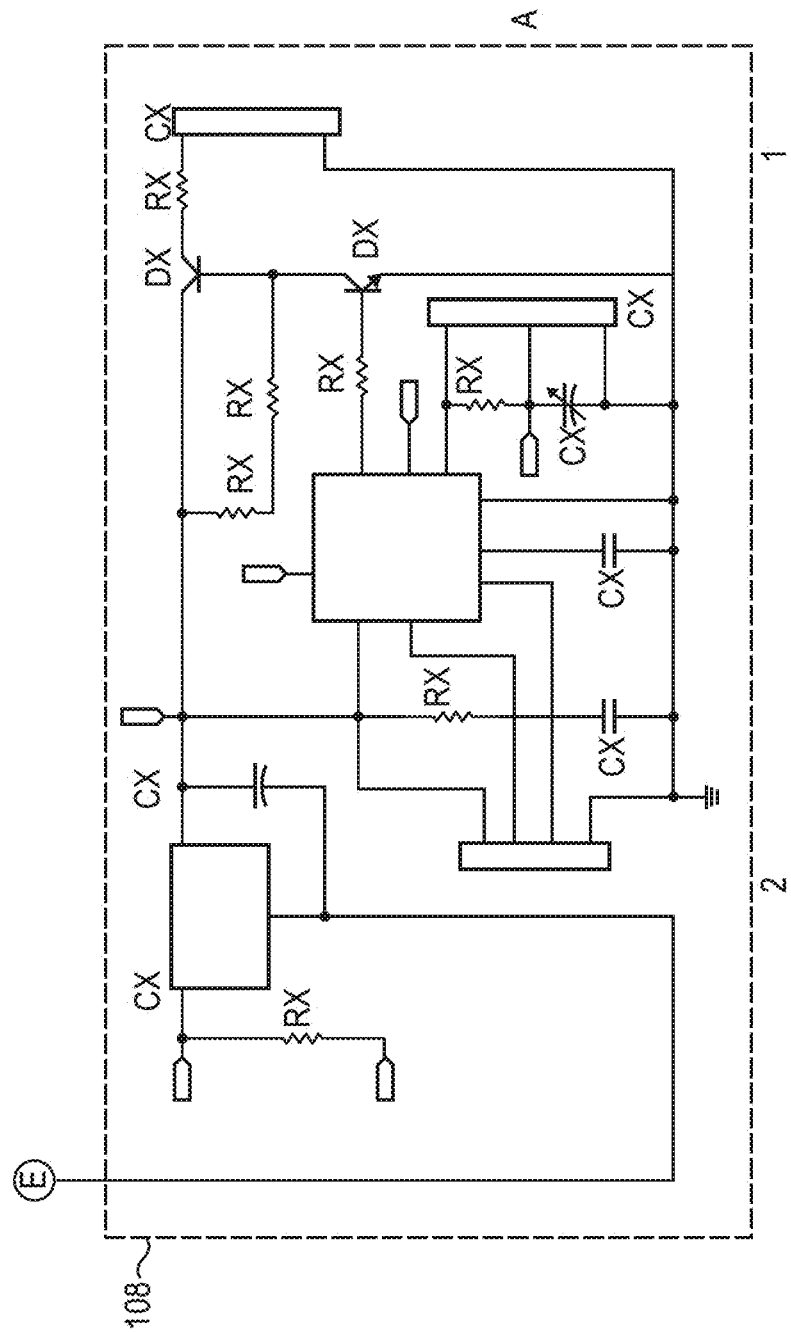
Figure 16:
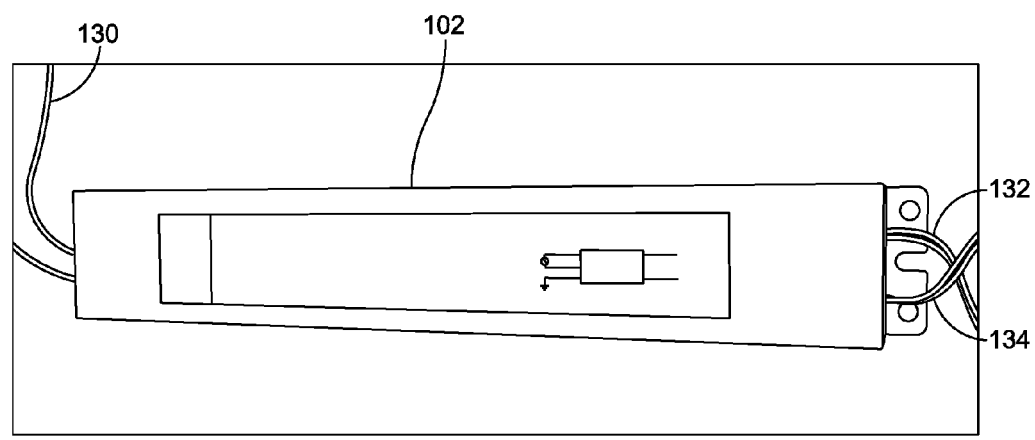
FIG. 16 is a perspective view on one embodiment of a power supply module according to the disclosure.

As noted above, the lighting assembly 100 includes a power supply 102, which is configured in combination with the LED light assemblies 104 to retro-fit or replace existing overhead light fixtures 114 so that the LED light assemblies 104 can be used in the existing overhead light fixtures 114 or in various embodiments of the lighting system disclosed herein. FIG. 15 is a schematic view and FIG. 16 is a photo of a perspective of one embodiment of a power supply module according to the disclosure. The power supply module comprises various sub-circuits including an over current, rectifying and smoothing circuit 136, a micro-controller circuit 138, a stable current and voltage maintenance circuit 140, and a controller circuit 108, that will be further discussed herein. As can be seen from the simplified schematic diagram on the top of the power supply module of FIG. 16, the power supply module receives a standard 120 Volts AC input signal on input line 130 and converts the standard input voltage and current to two parallel output DC voltage signals on lines 132, 134 to power two LED light assemblies 104.

Figure 17:
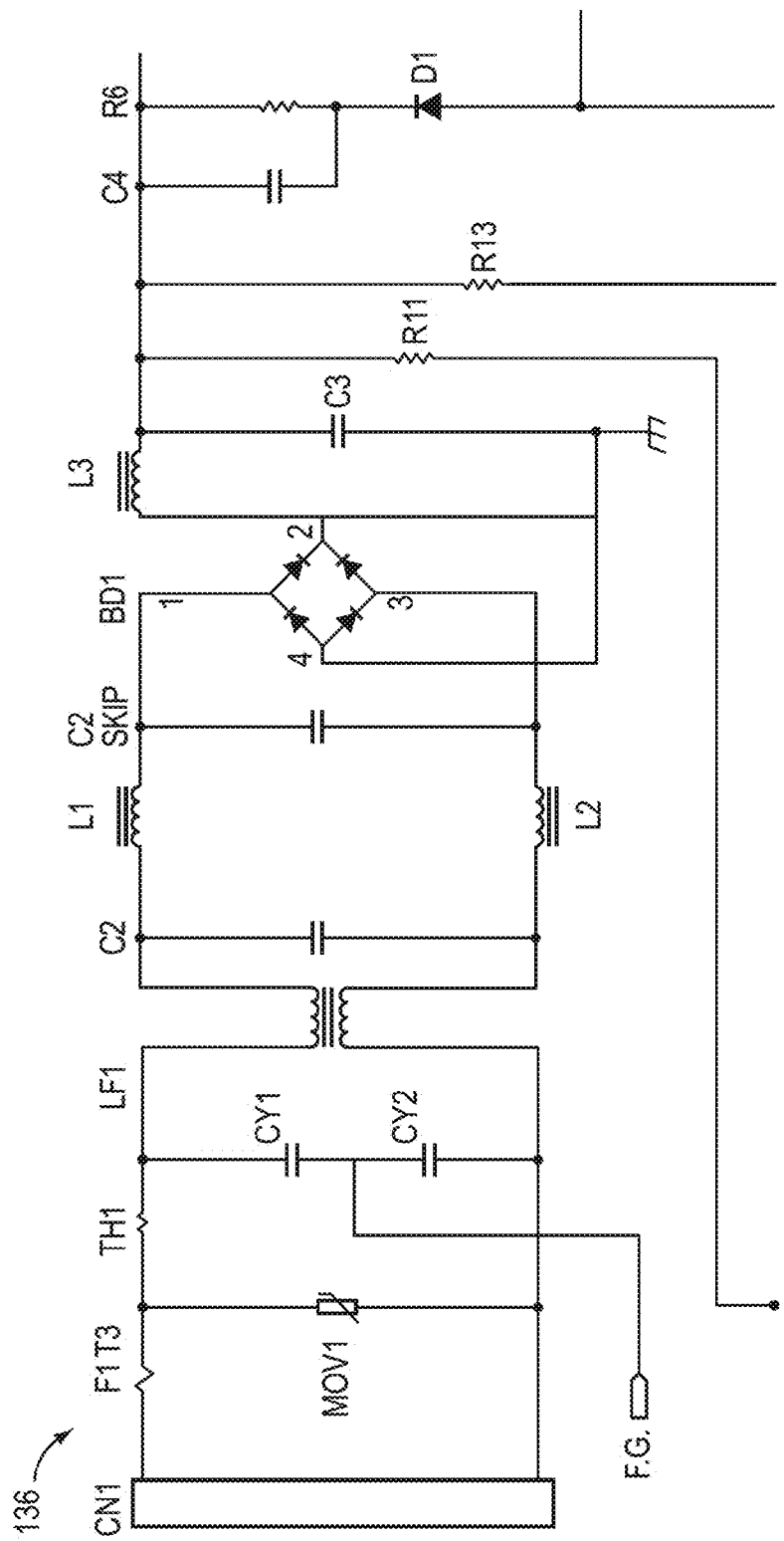
FIG. 17 is a schematic of a rectifying and smoothing circuit of the power supply circuit according to the disclosure.

Referring to FIG. 17, the power supply module 102 includes a fuse protection circuit 136 that limits an overflow of current to the power supply, for example on initial connection of a 120 volt AC signal to the light assembly 104. In particular, the fuse limits peak current to the power supply when the AC signal is initially connected and maintains an instantaneous short-circuit due to an over current situation. It protects against possible fire or damage to parts by preventing an inflow of over current. The fuse protection circuit 136 also includes a rectifying and smoothing circuit. The rectifying and smoothing circuit rectifies smoothes and filters the 120-240 VAC input signal to provide a rectified DC signal and to eliminate any high frequency noise. In particular LF1, C2, LI2 are a conduction noise filter that eliminates high frequency noise generated from the AC input signal. D1 rectifies the input AC signal and converts the rectified signal to DC. The power supply 102 also includes an RDC snubber circuit, which limits the peak voltage provided to the drain of the MOSFET, as known to those of skill in the art, for example when the controller is switched off.

Figure 18:
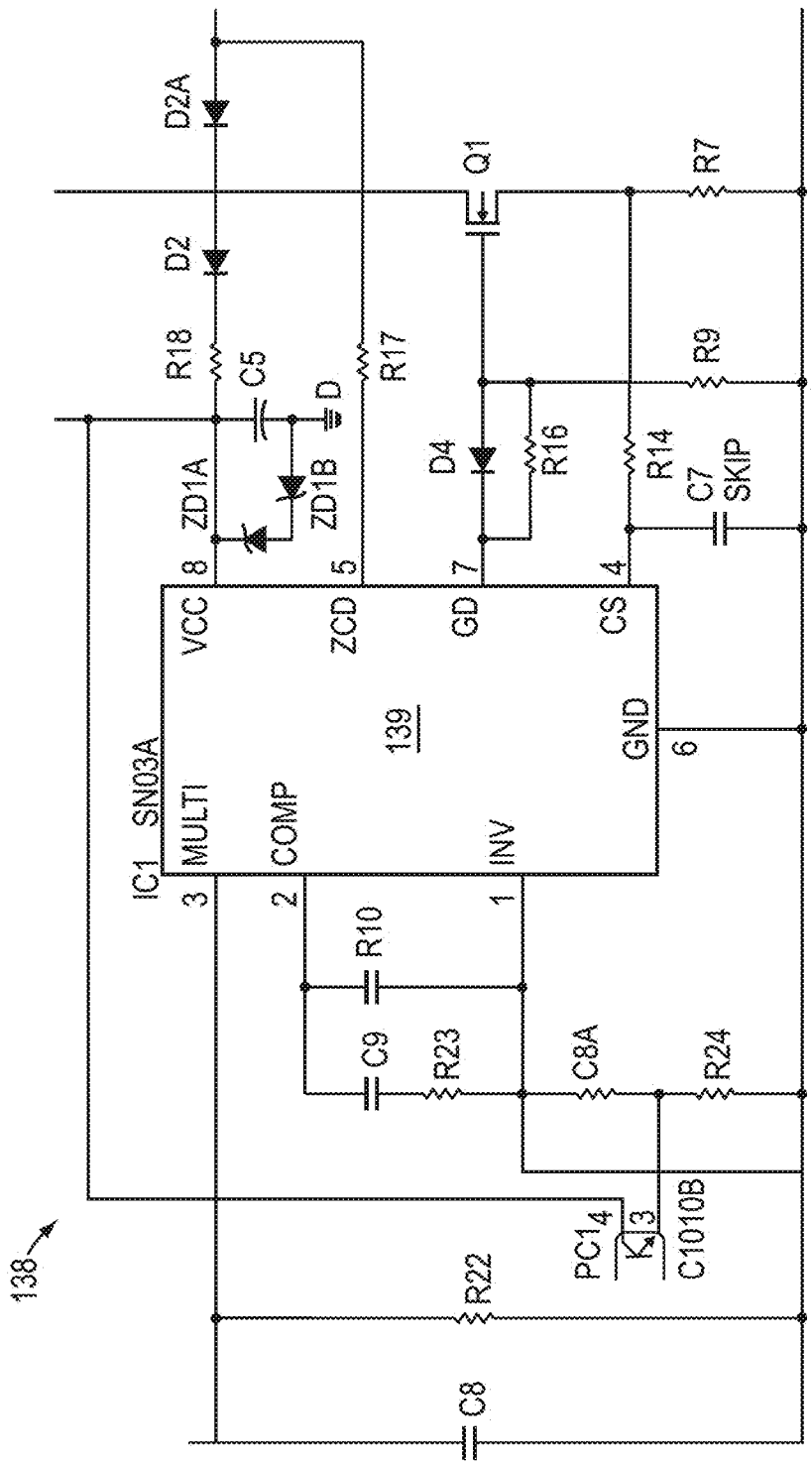
FIG. 18 is a schematic of a controller circuit according to the disclosure.

Referring to FIG. 18, the power supply module includes the microcontroller circuit 138. The micro-controller circuit 138 includes a controller chip 139 that receives input signals and controls a duty width of signals provided at an output and in combination with the FET Q1 to limit the maximum output current provided by the power supply module 102. The power supply module also includes a secondary rectification circuit that rectifies through diode D5 high frequency power generated from switching the IC controller 139 and smoothes this energy to a DC signal with capacitor C16. Further, the power supply also includes an output voltage maintenance circuit that maintains 24 Volts through the Zener Diode ZD1 and controls the current at the photodiode PC1 to maintain a stable output voltage.

Figure 19:
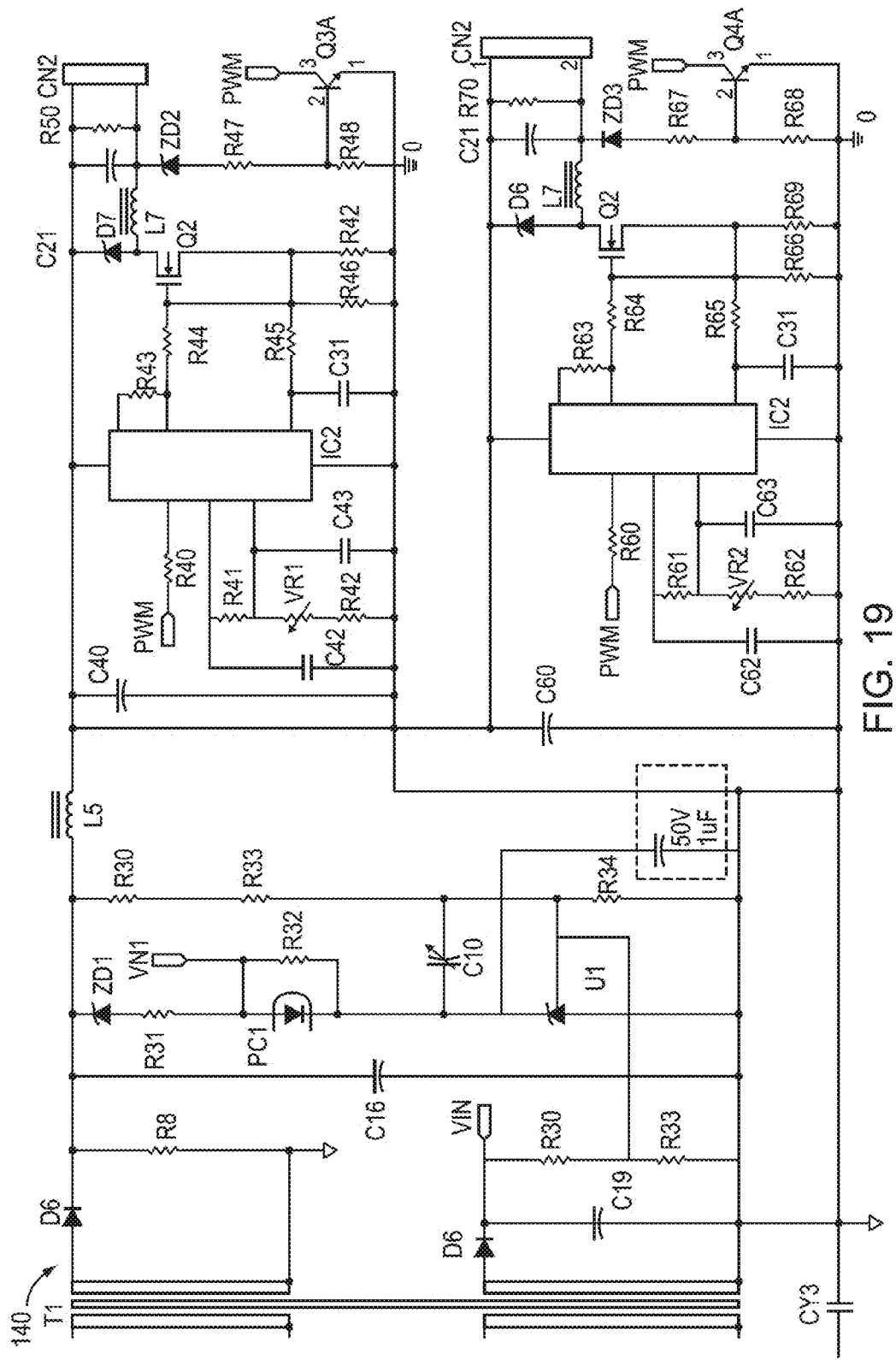
FIG. 19 is a schematic of a stable current and voltage maintenance circuit according to the disclosure.

The power supply also includes a stable current and voltage maintenance circuit 140, which is illustrated in FIG. 19. The stable current and voltage maintenance circuit divides the output signal from the controller circuit 108 and smoothing circuit 136 into master and slave signals with stable currents that limit the maximum current and voltage to be provided to the LED light bulbs or lamps 104. The constant current control provides a constant current to each LED chip 122 of the LED light bulb 104. In particular, even if one of the LED chips fails (for any reason), the constant current control circuit maintain a constant current to the other LED chips in the array (the current doesn't increase), so that the LED chips are operating at an ideal constant current and voltage. One advantage of this circuit is that even if one or more LED chips in the array of chips fails, such failure will not result in acceleration of the failure of the remaining LED chips. Thus, the LED array of chips will have a lifetime of the individual LED chips and a longer lifetime than prior art LED devices that do not have such constant current and voltage control.

Figure 20:
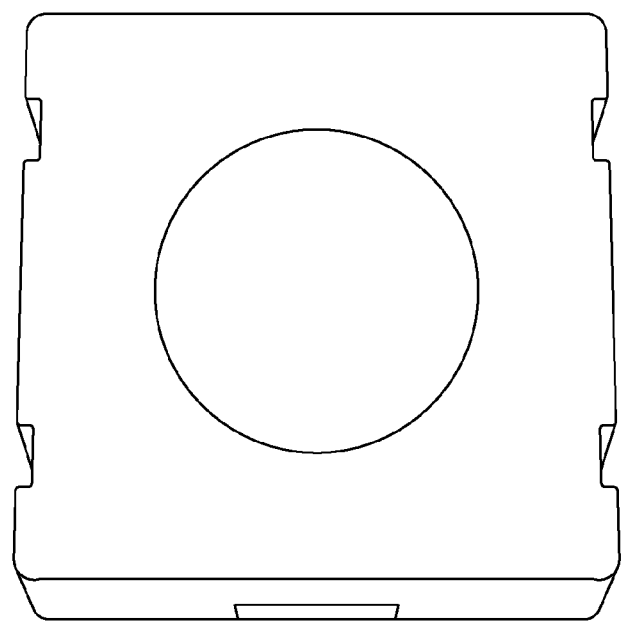
FIG. 20 illustrates an embodiment of the sensors mounted in an existing light fixture according to the disclosure.
Figure 21:
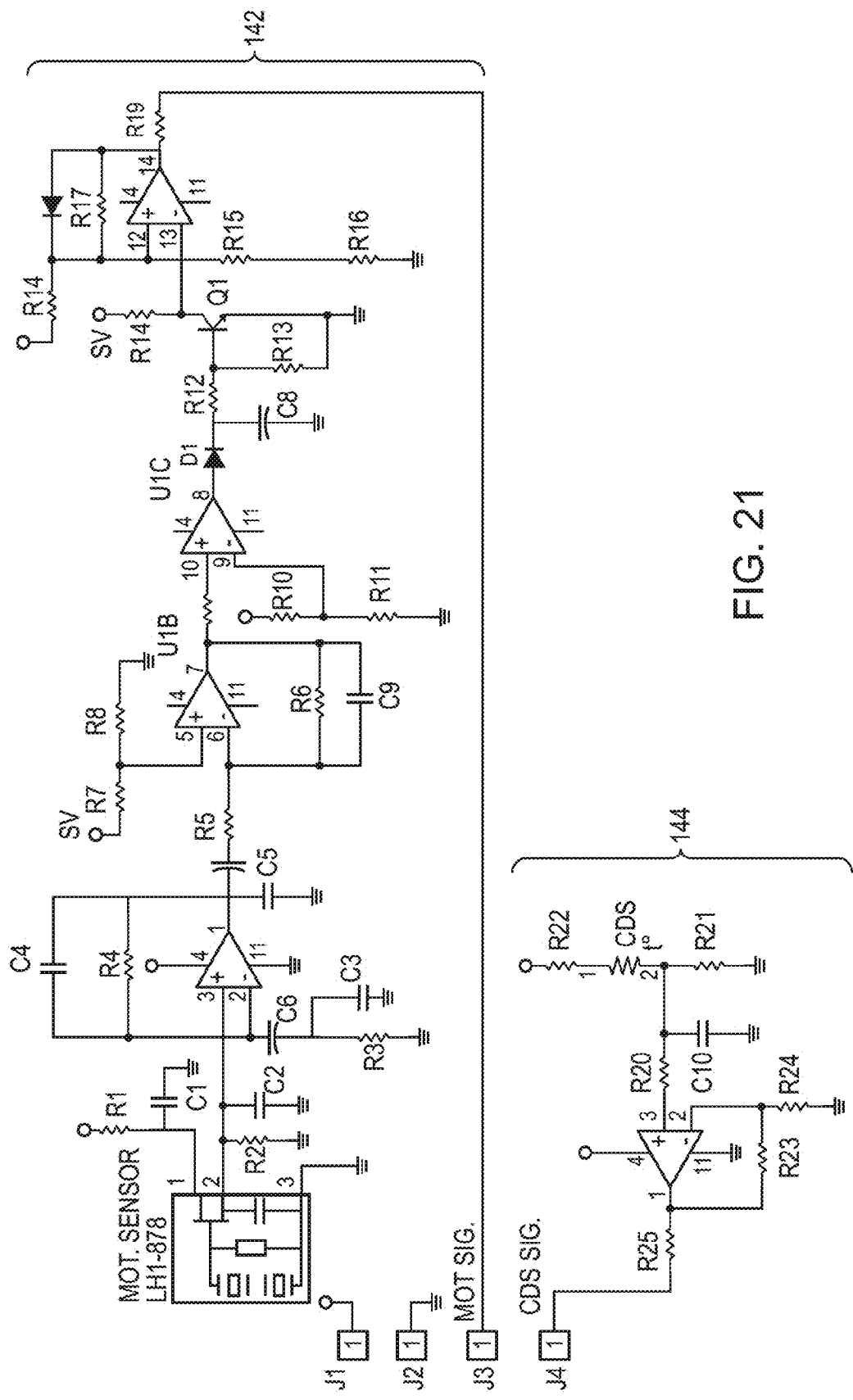
FIG. 21 is a schematic diagram of sensors according to the disclosure.
Figure 22:
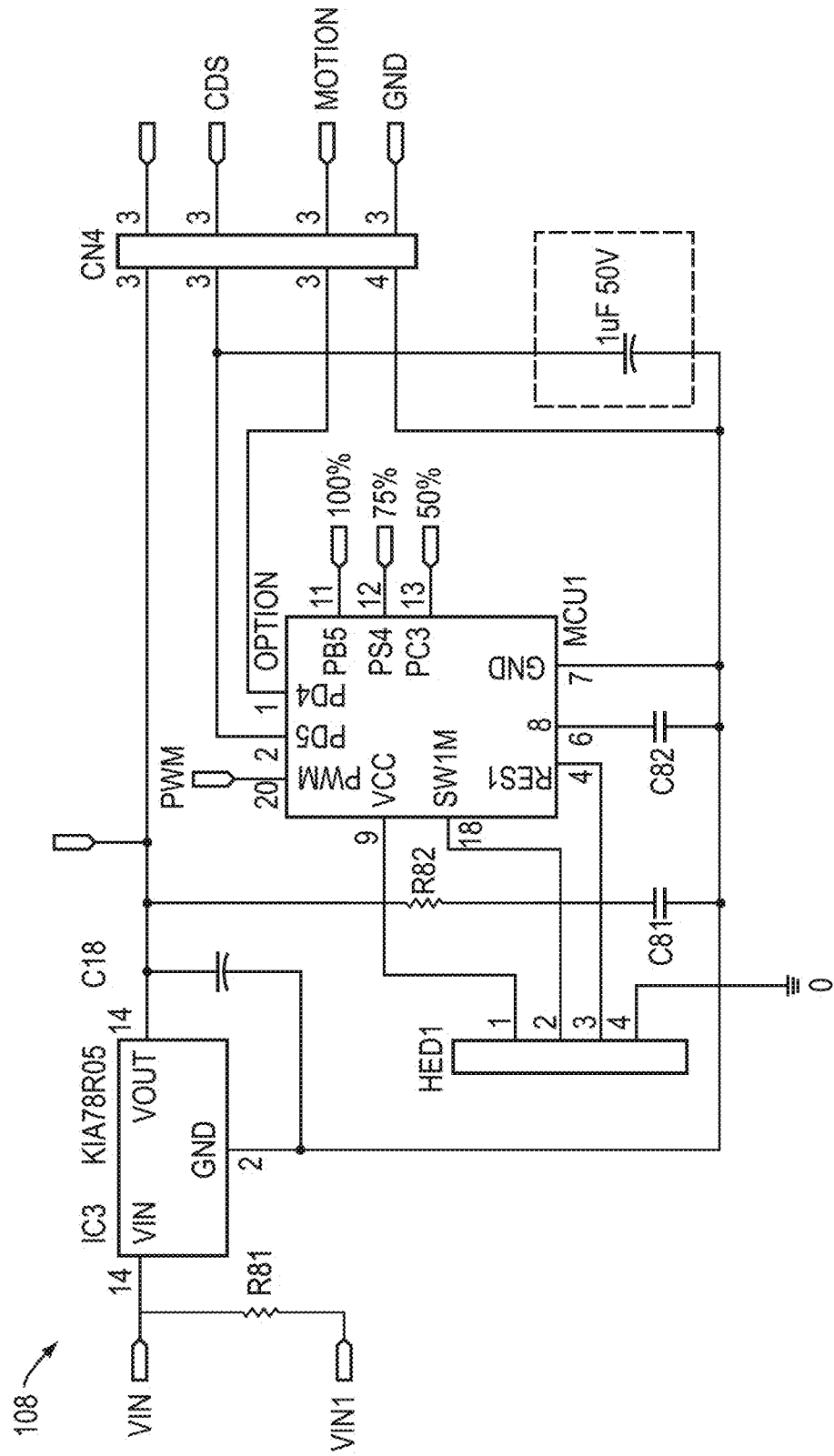
FIG. 22 is a schematic diagram of a microcontroller according to the disclosure.

FIG. 20 illustrates an embodiment of the sensors 106 that can optionally be provided as part of the lighting system 100 (see schematic diagram of FIG. 1) and that can be mounted in an existing light fixture 114 (See also FIG. 6 for a view of the sensors 106 mounted in the light fixture 114). FIG. 21 is a schematic diagram of the sensors circuits that can be used with the sensors 106. The sensor circuit includes a motion sensor circuit 144 that detects motion to provide for turning on the LED light bulbs or lamps 104 in response to the detected motion. The sensor circuit also includes an ambient light sensor circuit 142, which outputs a signal corresponding to an amount of detected ambient light. FIG. 22 is a schematic diagram of the microcontroller circuit 108 (See FIG. 1). The microcontroller circuit 108 in combination with the motion sensor 142 of sensors 106, combine to provide an output signal that turns on the LED light bulbs or lamps 104 in response to motion detected by the motion sensor. In addition, the microcontroller 108 in combination with the light sensor 142 of sensors 106, combine to provide an output signal that adjusts the amount of light output by LED light bulbs or lamps 104. For example, if no ambient light is detected by the light sensor 142, then the light bulbs or lamps can provide a maximum light output. Alternatively, if a sufficient amount of ambient light is detected, such as may occur in daylight, then LED light bulbs or lamps can be controlled, for example to only provide half of the light capacity of the LED light bulbs or lamps. It is to be appreciated that the controller can be configured to control the amount of light to be output by the LED light bulbs or lamps to a desired level and as a function of the amount of ambient light detected. One advantage of this aspect of the lighting system 100 of the disclosure is that the amount of power consumed by the lighting system can be reduced in response to an amount of ambient light, thus providing for energy savings (reduced power consumption) as a function of ambient light conditions.

Figure 23:
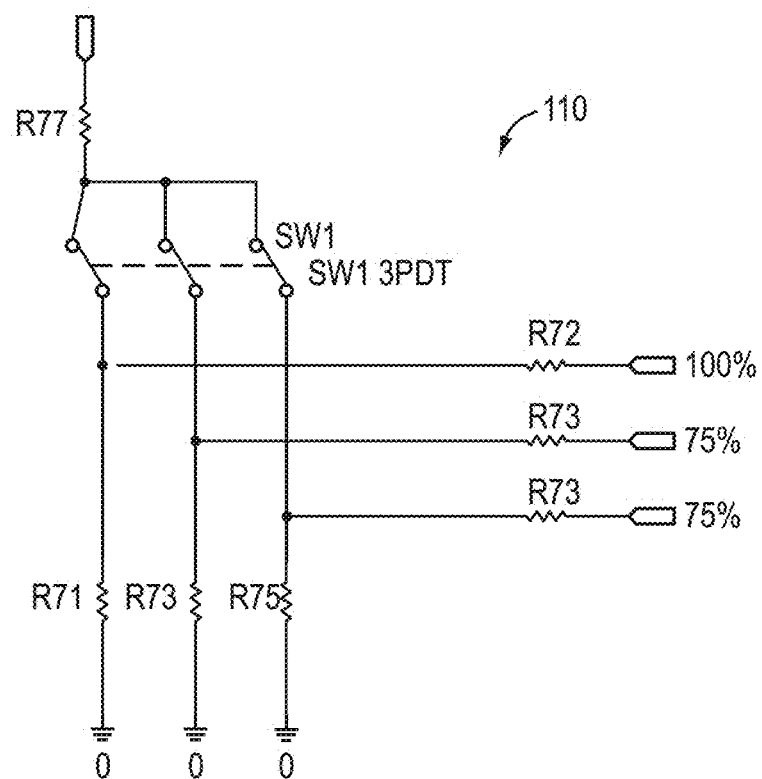
FIG. 23 illustrates a schematic diagram of one embodiment of a multi-position switch according to the disclosure.

It is to be noted that the LED light assemblies 104 according to this disclosure provide a lot more light than is typical for fluorescent light bulbs or lamps that they are intended to replace. In particular, it has been measured and tested that an existing fixture 114 retrofitted with 2 LED assemblies 104 according to this disclosure provides a lot more light than the same fixture having 3 fluorescent bulbs. Thus it may be desirable depending on the location of the existing fixture 114 to be retrofitted or a new lighting fixture comprising the lighting system of this disclosure to dim the maximum amount of light provided by the fixture provided with the LED light assemblies 104. FIG. 23 illustrates a schematic diagram of one embodiment of the multi-position switch 110 (See FIG. 1). Referring to FIG. 1, the power supply module 102 and the microcontroller 108 in combination with the multi-position switch 110 combine to provide an output signal that adjusts the amount of light output by each of the LED light assemblies 104. For example, an existing fixture 114 as illustrated in FIG. 5 retrofitted with 2 LED light assemblies 104 and the lighting system 100 including the multi-position switch 110, can be set at the time of retrofitting and installing the fixture to a maximum light output that is appropriate for the fixture location and that can be less than 100% capacity of the two LED light assemblies 104. Thus another advantage of this aspect of the lighting system of the disclosure is that the amount of power consumed by the lighting system can be reduced depending on the fixture location, thus providing for energy savings (reduced power consumption) as a function of fixture location and an amount of light needed.

For example, referring to FIG. 24, there is illustrated one embodiment a table of a maximum output current provided by the controller circuit 108 and the power supply module 102 to the LED light assembly 104 in response to the, output signal from the multi-position switch 110, having 3 switches (SW3, SW2, SW1). The switch setting provides for operating the assembly in various modes. For example, referring to row 2710, for a switch setting of 001 (SW3, SW2, SW1), the assembly is configured to sense ambient light conditions with sensor 106 (see FIG. 1) and ambient light sensor circuit 142, and provide a maximum output current of 550 mAmps; referring to row 2712, for a switch setting (SW3, SW2, SW1) of 010, the assembly is configured to sense ambient light conditions with sensors 106 (see FIG. 1) and ambient light sensor circuit 142, and provide a maximum output current of 500 mAmps; referring to row 2714, for a switch setting of 100 (SW3, SW2, SW1), the assembly is configured to sense ambient light conditions with sensors 106 (see FIG. 1) and ambient light sensor circuit 142, and provide a maximum output current of 450 mAmps. For each of these switch settings (SW3, SW2, SW1), the microcontroller 108 and power supply 102 are configured to provide an output current to the LED light assembly that is stepped over a voltage range from the maximum current value configured by the switch to a minimum current value (for example 250 mAmps) as a function of a sensed amount of ambient light sensed by the sensors 106 and ambient light sensor circuit 142 of the environment that the lighting system 100.

Figure 25:
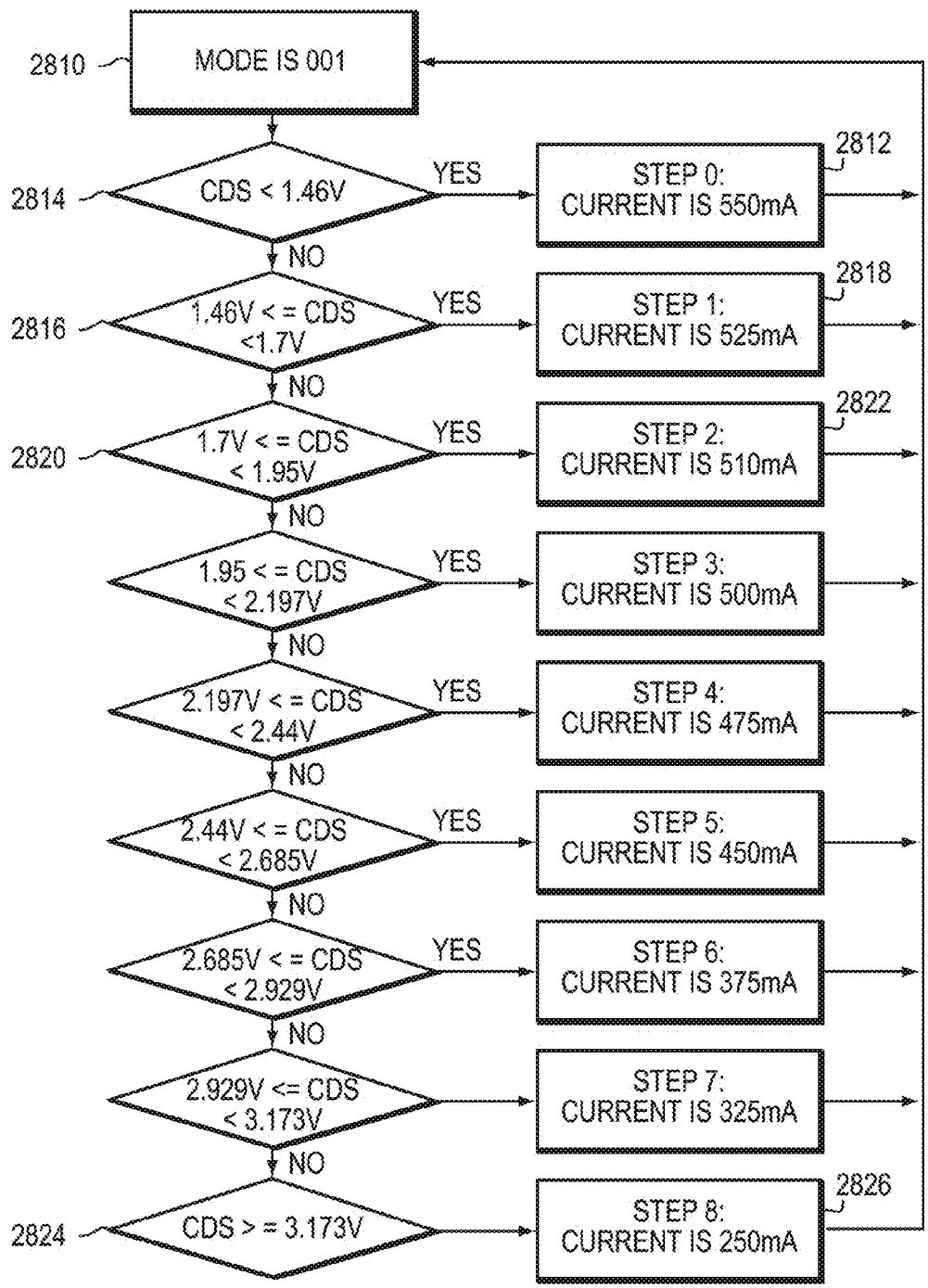
FIG. 25 illustrates a flow chart of current provided to the LED's of the lighting assembly for the switch configured with a first setting as a function of light sensed by an ambient light sensor.

For example, referring to FIG. 25, for the switch configured with a 001 (SW3, SW2, SW1) setting (2810), the maximum output current provided by the controller 108 and power supply module 102 is 550 mAmps (2812) with a sensed voltage CDS (See also FIG. 23) from an ambient light sensor of <1.46 V (2814), which corresponds to a minimum amount of ambient light. With a sensed voltage CDS from an ambient light sensor of 1.46V<CDS<1.7V (2816), which corresponds to more ambient light, the maximum output current provided by the controller 108 and power supply module 102 is stepped down to 525 mAmps (2818), which provides less light by the LED light assembly 104 and less power consumption. Further, with a sensed voltage CDS from an ambient light sensor of 1.7V<CDS<1.95V (2820), which corresponds to even more ambient light, the maximum output current provided by the power supply 102 is stepped down further to 510 mAmps (2822), which provides even less light by the LED lamp and even less power consumption. The controller 108 is configured with this process of stepping down the maximum output current provided by the power supply module 102 as function of the sensed voltage CDS from an ambient light sensor, and has a total of 9 steps all the way up to a sensed voltage CDS from an ambient light sensor of >3.173V (2824), which corresponds to a maximum amount of ambient light and a minimum amount of output current provided by the power supply 102 of 250 mAmps (2826), which provides minimum light by the LED lamp for maximum ambient light conditions.

Figure 26:
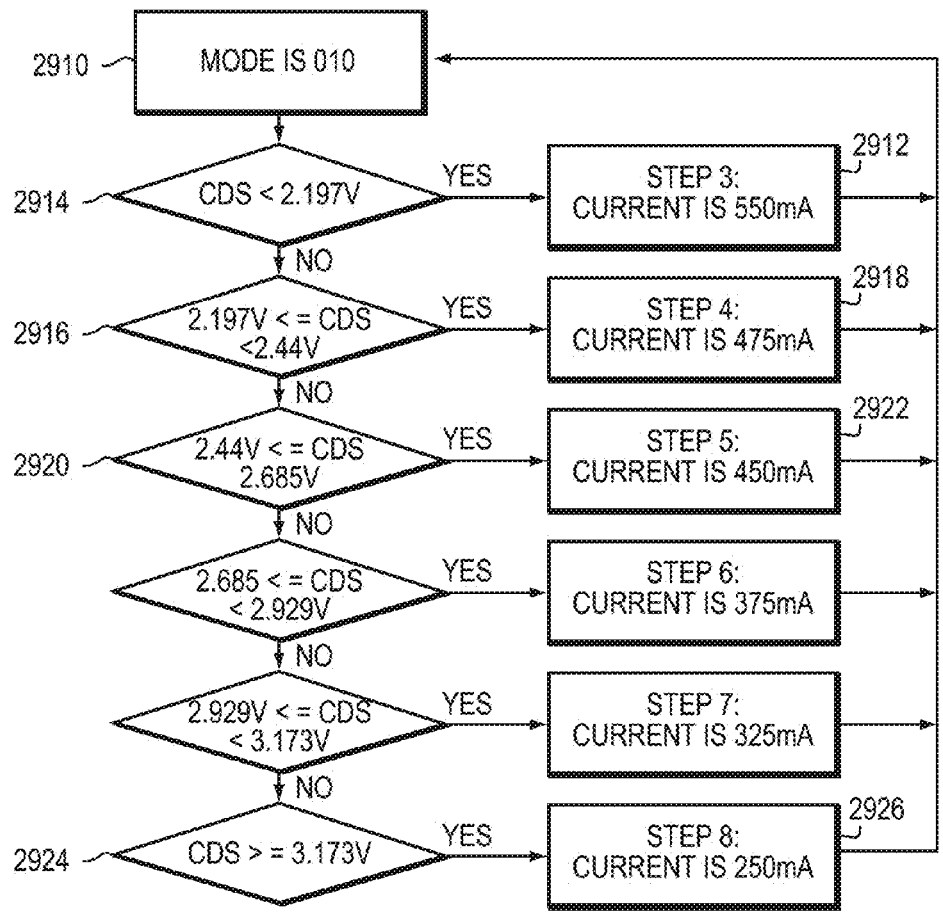
FIG. 26 illustrates a flow chart of current provided to the LED's of the lighting assembly for the switch configured with a second setting as a function of light sensed by an ambient light sensor.

Another embodiment is illustrated with respect to FIG. 26 for the switch configured with a switch (SW3, SW2, SW1) setting of 010 (2910). For this setting of the switch, the maximum output current provided by the power supply 102 is 500 mAmps (2912) with a sensed voltage CDS (See also FIG. 23) from an ambient light sensor of <2.197 Volts (2914), which corresponds to a minimum amount of ambient light for this switch setting. With a sensed voltage CDS from an ambient light sensor of 2.197V<CDS<2.44V (2916), which corresponds to more ambient light, the maximum output current provided by the power supply 102 is stepped down to 475 mAmps (2918), which provides less light by the LED lamp and less power consumption. Further, with a sensed voltage CDS from an ambient light sensor of 2.44V<CDS<2.685V (2920), which corresponds to even more ambient light, the maximum output current provided by the power supply 102 is stepped down further to 450 mAmps (2922), which provides even less light by the LED lamp and even less power consumption. The controller 108 is configured with this process of stepping down the maximum output current provided by the power supply module 102 as function of the sensed voltage CDS from an ambient light sensor and has a total of 6 steps all the way up to a sensed voltage CDS from an ambient light sensor of >3.173V (2924), which corresponds to a maximum amount of ambient light and a minimum amount of output current provided by the power supply 102 of 250 mAmps (2926), which provides minimum light by the LED light assembly 104 for maximum ambient light conditions.

Figure 27:
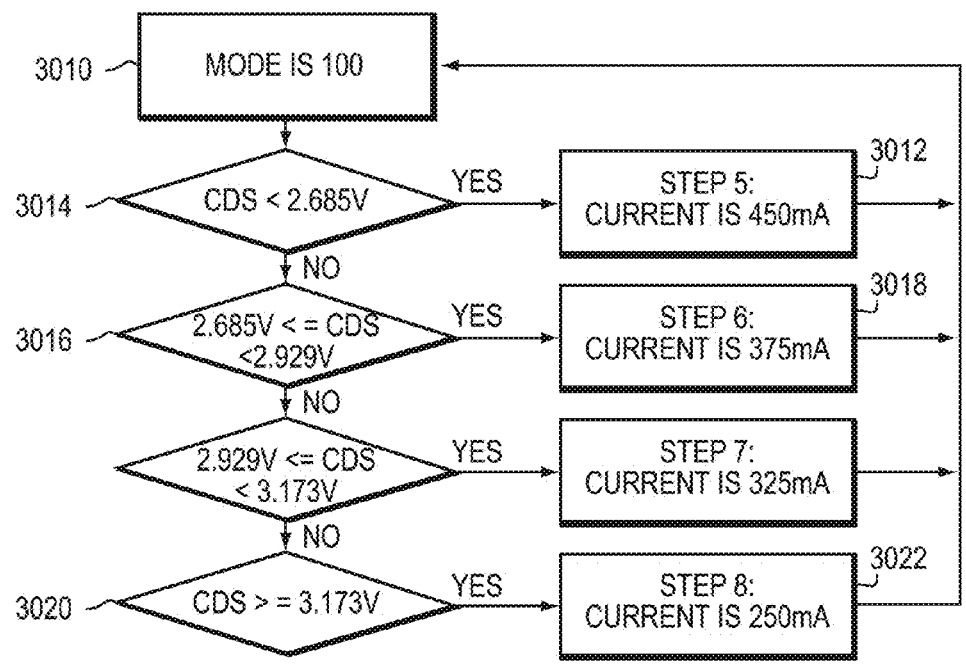
FIG. 27 illustrates a flow chart of current provided to the LED's of the lighting assembly for the switch configured with a third setting as a function of light sensed by an ambient light sensor.

Another embodiment is illustrated with respect to FIG. 27 for the switch configured with a switch (SW3, SW2, SW1) setting of 100 (3010). For this setting of the switch, the maximum output current provided by the controller 108 and power supply 102 is 450 mAmps (3012) with a sensed voltage CDS (See also FIG. 23) from an ambient light sensor of <2.685 Volts (3014), which corresponds to a minimum amount of ambient light for this switch setting. With a sensed voltage CDS from an ambient light sensor of 2.685V<CDS<2.929V (3016), which corresponds to more ambient light, the maximum output current provided by the power supply 102 is stepped down to 375 mAmps (3018), which provides less light by the LED light assembly 104 and less power consumption. The controller 108 is configured with this process of stepping down the maximum output current provided by the power supply module 102 as function of the sensed voltage CDS from an ambient light sensor, and has a total of 4 steps all the way up to a sensed voltage CDS from an ambient light sensor of >3.173V (3020), which corresponds to a maximum amount of ambient light and a minimum amount of output current provided by the power supply 102 of 250 Amps (3022), which provides minimum light by the LED lamp for maximum ambient light conditions.

Referring again to FIG. 24, there are also illustrated settings for the switch 110 that configure the controller 108 of the lighting system 100 to operate in a motion detection mode and to provide a corresponding maximum output current provided by the power supply module 102 to the LED light assembly 104 as a function of the switch 110 settings. The switch setting and controller 108 provides for operating the light assembly 104 in various brightness and power consumption modes based on motion detection. For example, referring to row 2716 as will be explained in further detail below, for a switch setting (SW3, SW2, SW1) of 011, the assembly is configured to sense motion with sensors 106 (see FIG. 1) and provide a maximum output current of 550 mAmps; referring to row 2718, for a switch setting (SW3, SW2, SW1) of 110, the assembly is configured to sense motion with sensors 106 (see FIG. 1) and provide a maximum output current provided is 500 mAmps; referring to row 2720, for a switch setting (SW3, SW2, SW1) of 101, the assembly is configured to sense motion with sensors 106 (see FIG. 1) and provide a maximum output current of 450 mAmps. For each of these switch 110 settings, the microcontroller 108 and power supply 102 are configured to provide a maximum output current to the LED lamp as a function of sensed motion.

Figure 28:
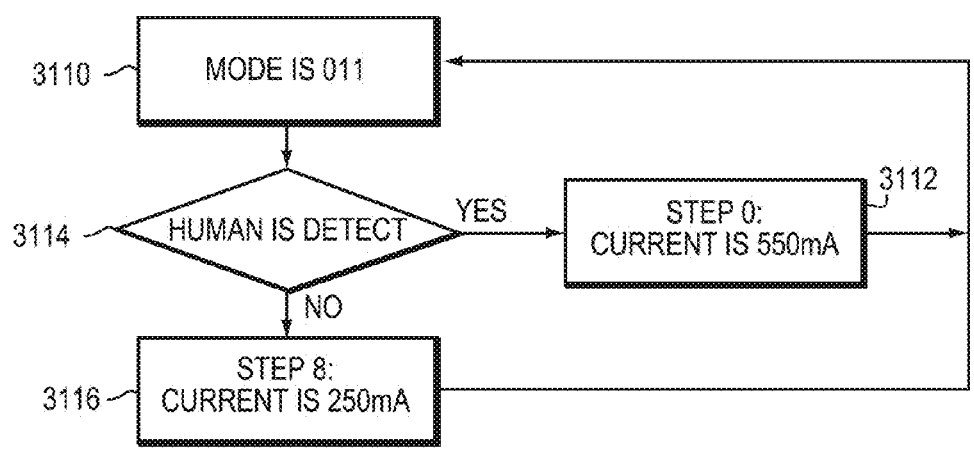
FIG. 28 illustrates a flow chart of current provided to the LED's of the lighting assembly for the switch configured with a fourth setting as a function of motion sensed by a motion sensor.
Figure 29:
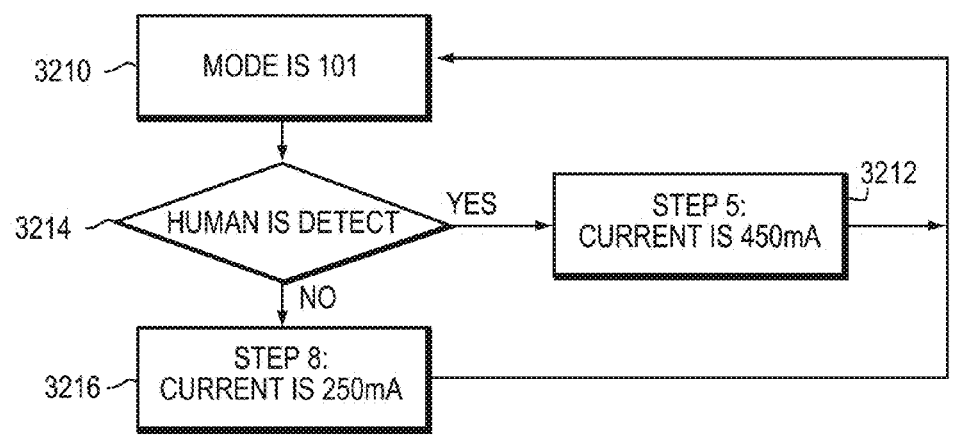
FIG. 29 illustrates a flow chart of current provided to the LED's of the lighting assembly for the switch configured with a fifth setting as a function of motion sensed by an motion sensor.
Figure 30:
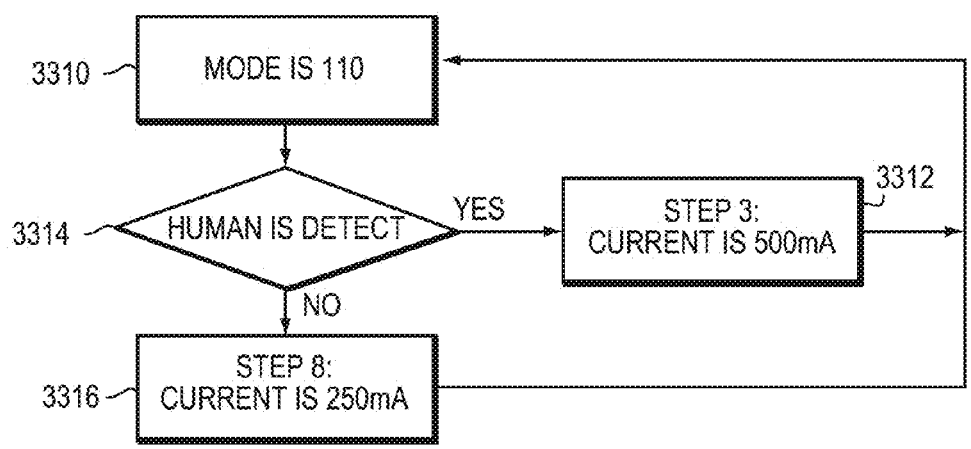
FIG. 30 illustrates a flow chart of current provided to the LED's of the lighting assembly for the switch configured with a sixth setting as a function of motion sensed by a motion sensor.

For example, referring to FIG. 28, for the switch configured with a 011 (SW3, SW2, SW1) setting (3110), the maximum output current provided by the power supply 102 is 550 mAmps (3112) in response to sensed motion (3114 YES) with sensors 106 (see FIG. 1) and motion sensor circuit 144, and otherwise a minimum output current of 250 mAmps is provided (3116) by the power supply module 102 in response to no sensed motion (3114 NO) with sensors 106 and motion sensor circuit 144. Referring to FIG. 29, for the switch configured with a 101 (SW3, SW2, SW1) setting (3210), the maximum output current provided by the power supply module 102 is 450 mAmps (3212) in response to sensed motion (3214 YES) with sensors 106 and motion sensor circuit 144 (see FIG. 1) and otherwise a minimum output current of 250 mAmps is provided (3216) by the power supply module 102 in response to no sensed motion (3214 NO) with sensors 106 and motion sensor circuit 144. Similarly, referring to FIG. 30, for the switch configured with a 110 setting (3310), the maximum output current provided by the power supply 102 is 500 mAmps (3312) in response to sensed motion (3314 YES) with sensors 106 (see FIG. 1) and motion sensor circuit 144, and otherwise a minimum output current of 250 mAmps is provided (3316) by the power supply module 102 in response to no sensed motion (3314 NO) with sensors 106 and motion sensor circuit 144.

Referring again to FIG. 24, there are also illustrated settings (SW3, SW2, SW1) for the switch 110 that configure the lighting system 100 to provide a predetermined amount of output current by the power supply module 102 to the LED light assembly 104 as a function of the switch 110 settings. These switch settings provide for operating the assembly in various fixed brightness and power consumption modes with no ambient light sensing or motion detection. For example, referring to row 2722, for a switch setting (SW3, SW2, SW1) of 111, the assembly is configured to provide a maximum output current of 550 mAmps. This setting would typically be used for low ambient light conditions where no motion sensing or ambient light detection is being used. Referring to row 2724, for a switch setting (SW3, SW2, SW1) of 000, the assembly is configured to provide an output current of 250 mAmps. This setting would typically be used for an environment with good ambient light conditions and where no motion sensing or ambient light detection is being used or needed.

Another advantage of the controller 108 and the power supply module 102 and the LED light assemblies 104 according to this disclosure is that they combine to have a substantially constant Power Factor or efficiency of at least or greater than 99%, even when the amount of light output by the LED assemblies 104 is dimmed. For example, the lighting system of this disclosure has been tested and shown to have a power factor or efficiency of the lamps that remains at least 95% when the lamp light output is dimmed due to ambient light sensing by sensors 106 and ambient light sensing circuit 142 or due to fixing the amount of light output by LED light bulbs or lamps 104 to be less than maximum with the multi-position switch 110.

Figure 31:
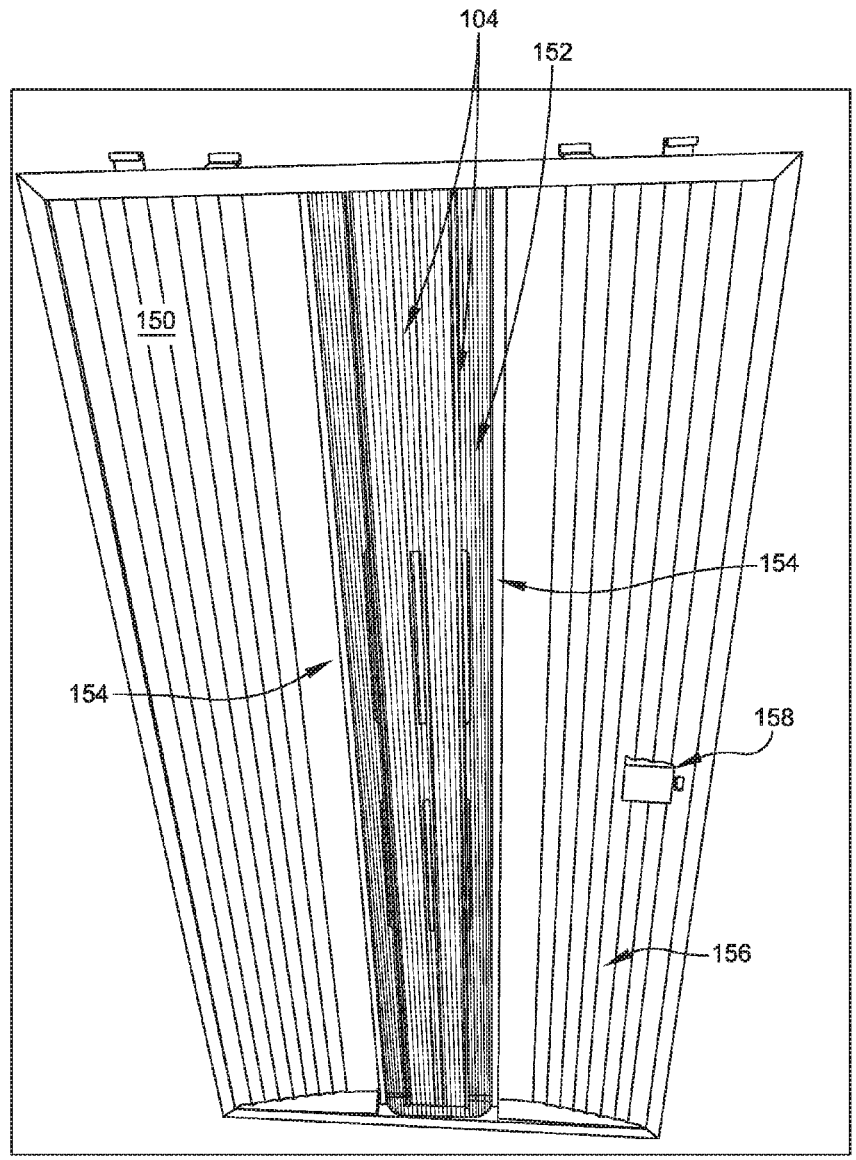
FIG. 31 is a photo of a front view of a second embodiment of a lighting system according to this disclosure.
Figure 32:
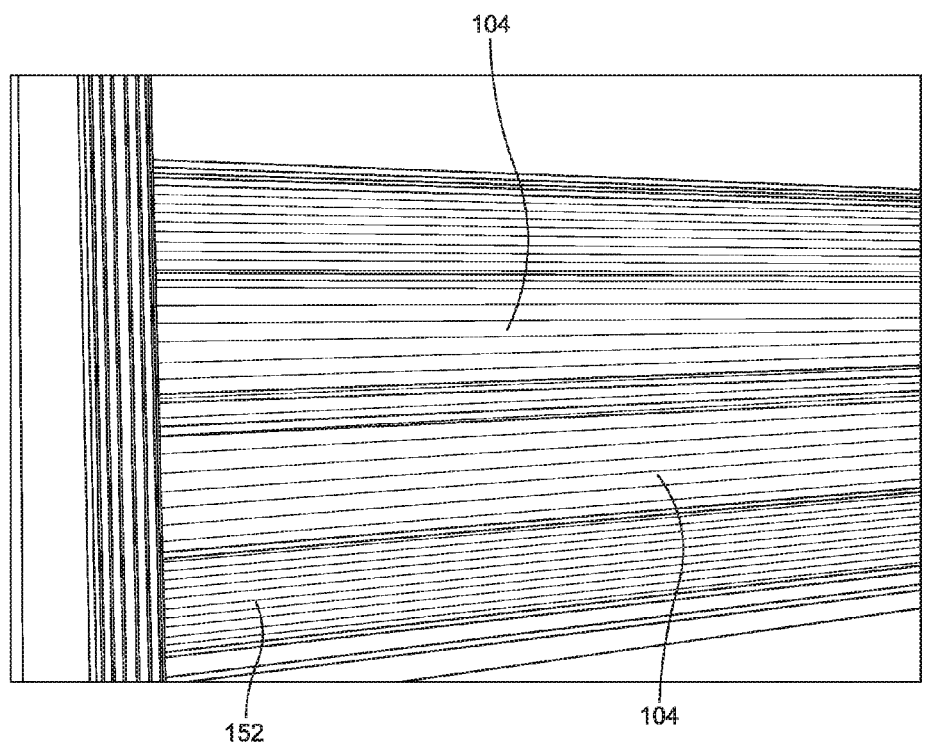
FIG. 32 is a photo of an exploded view of a portion of the light assembly showing a portion of the two light assemblies, a portion of the cover, and a portion of the rods for holding the cover of this second embodiment.
Figure 34:
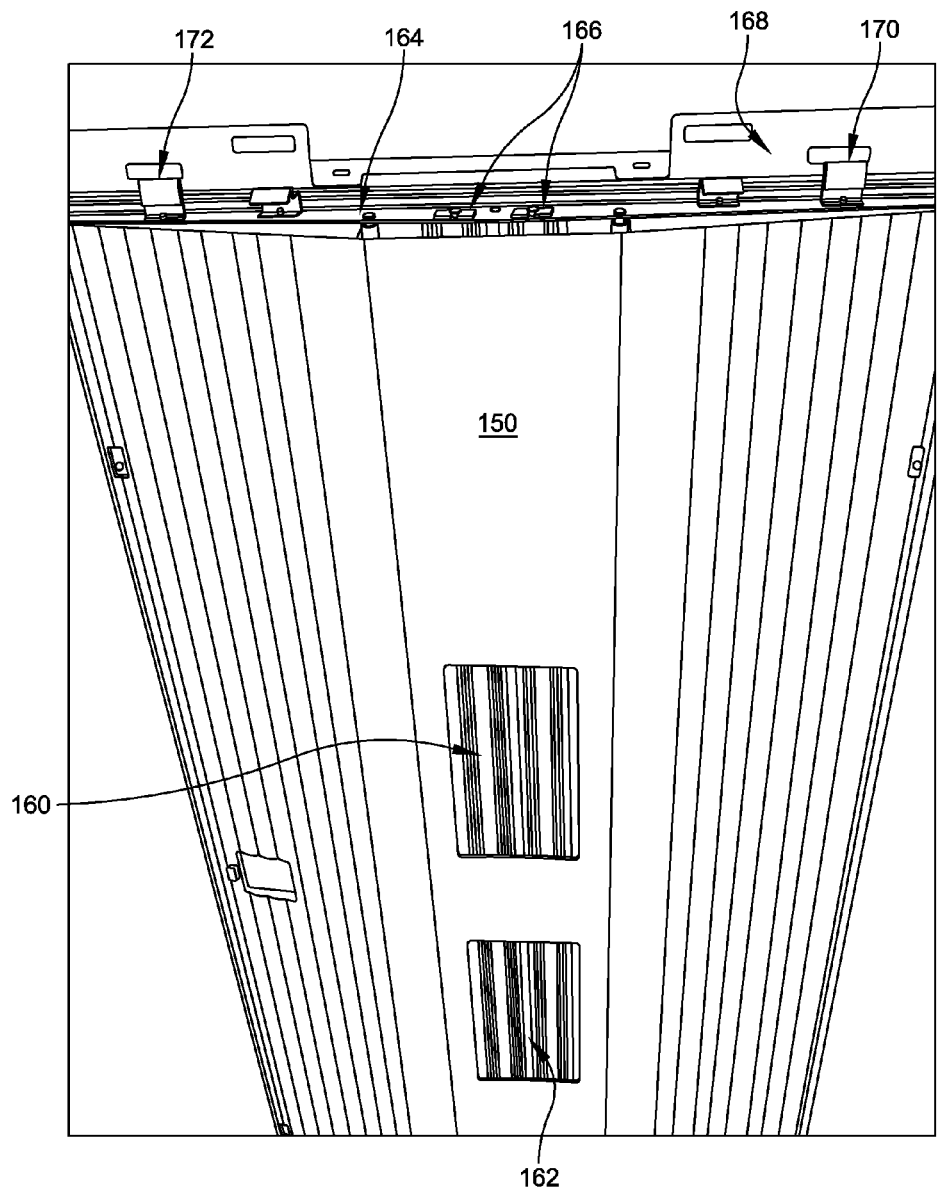
FIG. 34 illustrates a rear view of this second embodiment of the lighting system having slots in the reflector.

FIG. 31 is a photo of a front view of another embodiment of a lighting system 150 according to this disclosure. This embodiment of the lighting system 100 includes two light assemblies 104 (the light assemblies do not have a cover 116 over the individual light assemblies), and a cover 152 that covers the combination of both light assemblies 104. The cover 154 is held in place by rods 154. The lighting system also includes a reflecting background 156, a slot 158 for the sensors 106 (as illustrated in other embodiments). FIG. 32 is a photo of an exploded view of a portion of the light assembly 100 showing a portion of the two light assemblies 104, a portion of the cover 152, and a portion of the rods 154 As can be seen in FIG. 32, the cover 152 has corrugations along the length of the cover that result in disbursement of light from the light assemblies 104 along the width of the light assemblies 104 and along the width of the cover. The corrugations in the cover 152 are similar to the corrugations in the cover 116 as shown in FIG. 33. FIG. 34 illustrates a rear view of the lighting system 150 having slots 160, 162 in the reflector 156 (through which can be seen a portion of the respective backs of the bases 118 of the lights assemblies 104), which are provided for allowing heat to escape the combination of the light assemblies 104 and cover 152 so as to provide cooling of the overall lighting assemblies 104. Though not shown in FIG. 34, the lighting system also includes also includes the power supply module 102, the micro controller 108, and the multiple position switch 110, which can all be provided on the back side of the reflector 154 and within a frame 164 and casing for the frame (not illustrated) that houses the overall lighting system 150. It is to be appreciated that the lighting system can also optionally comprise sensors 106, ambient light sensor circuit 142, and motion sensor circuit 144.

Figure 35:
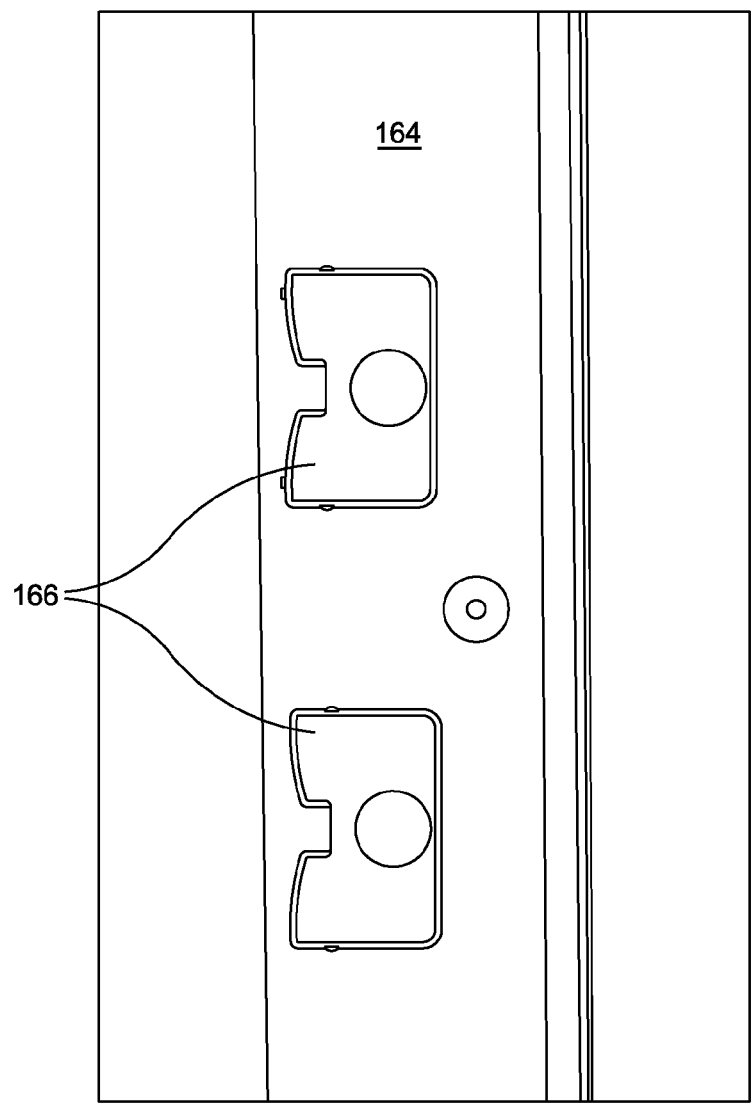
FIG. 35 shows a photo of an exploded view of bracket pins inserted into a portion of the frame of the lighting system of this second embodiment.
Figure 36:
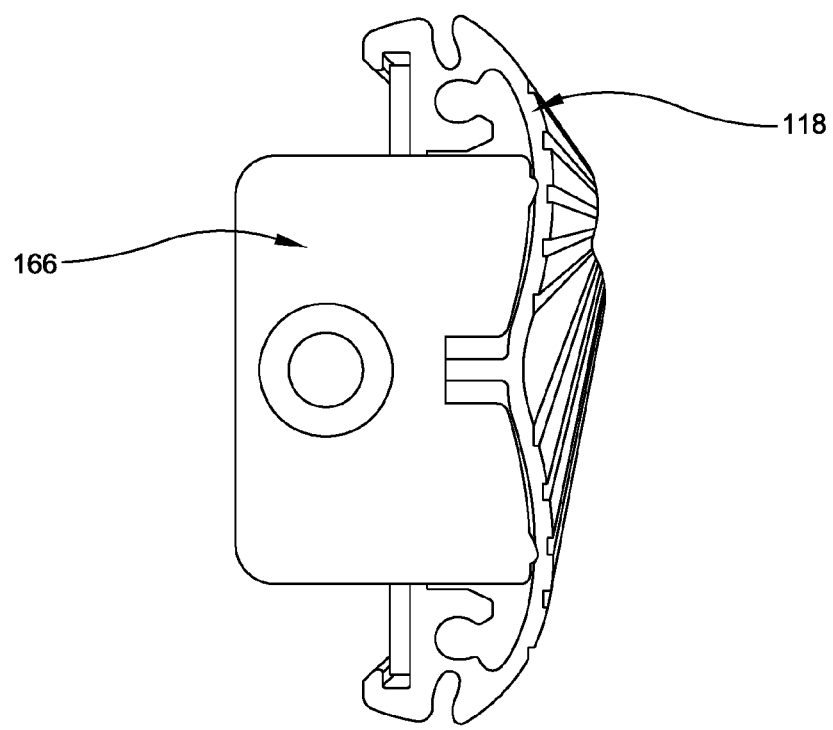
FIG. 36 shows a bracket pin inserted into the end of the base of the lighting assembly of this second embodiment.
Figure 37:
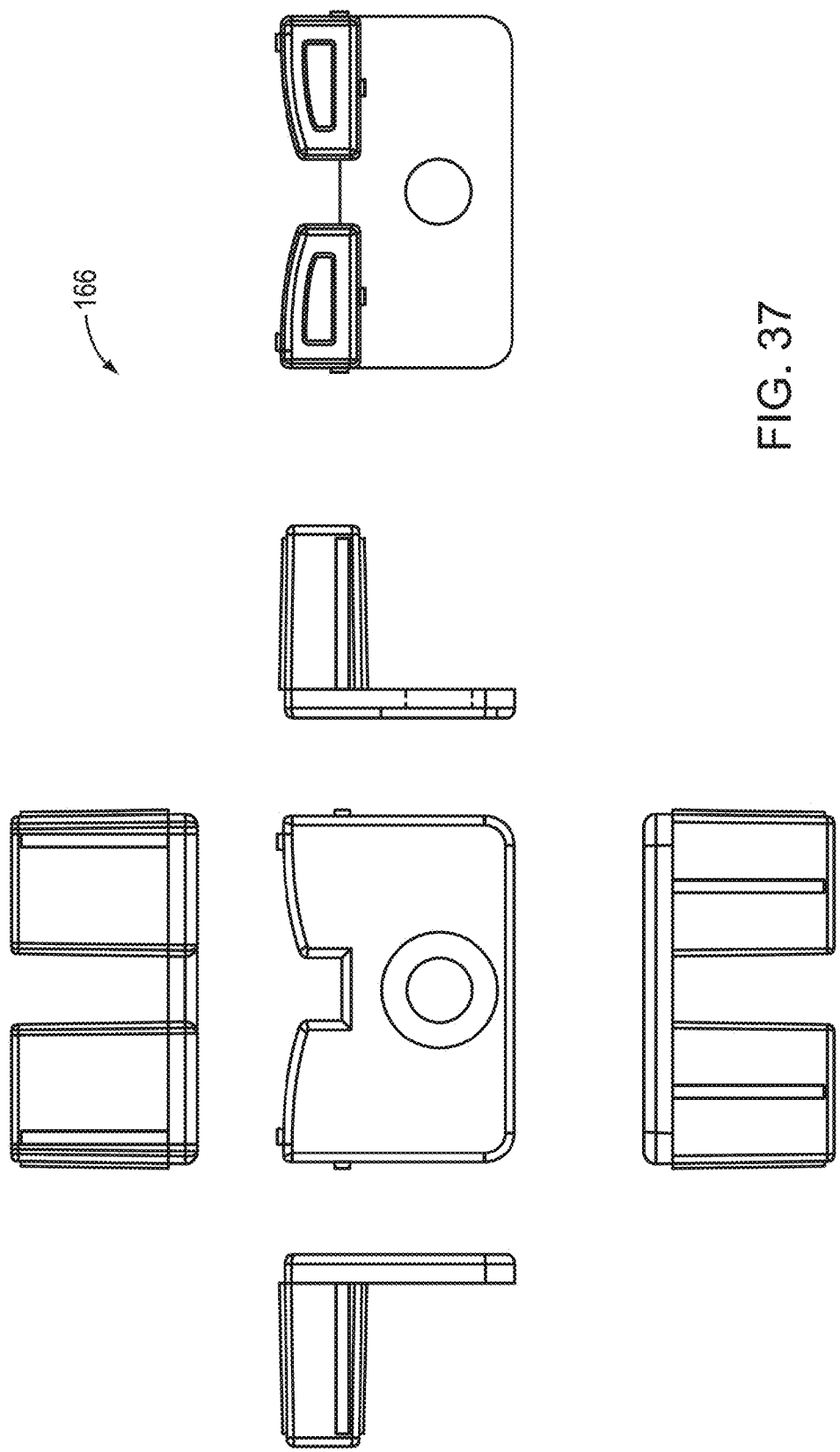
FIG. 37 is a mechanical drawing of the bracket pin of this second embodiment.
Figure 38:
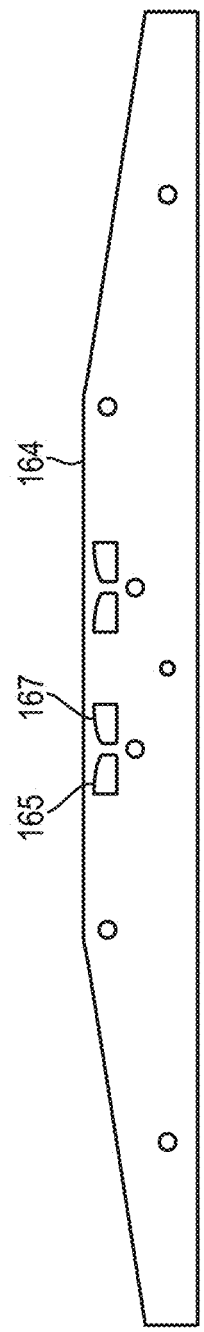
FIG. 38 is mechanical drawing of a portion of the frame including slots for receiving the bracket pin of this second embodiment.

Referring to FIG. 34, the lighting system 100 also includes bracket pins 166 which can be inserted through the frame 164 and into the ends of the bases 118 of the lighting assemblies 104 so as to secure the lighting assemblies 104 to the frame 164. FIG. 35 shows a photo of an exploded view of the bracket pins 166 inserted into a portion of the frame 164. FIG. 36 shows a bracket pin 166 inserted into the end of the base 118 of the lighting assembly 104 (without the frame 166 obstructing the view). FIG. 37 is a mechanical drawing of the bracket pin 166. FIG. 38 is mechanical drawing of a portion of the frame 165 including slots 165, 167 for receiving the bracket pin 166.

Figure 39:
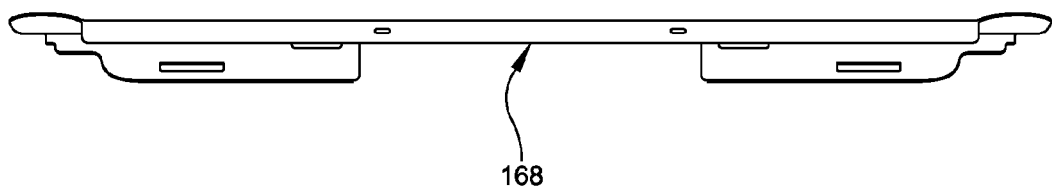
FIG. 39 is a photo of a perspective view of the hanging bracket of this second embodiment.
Figure 40:
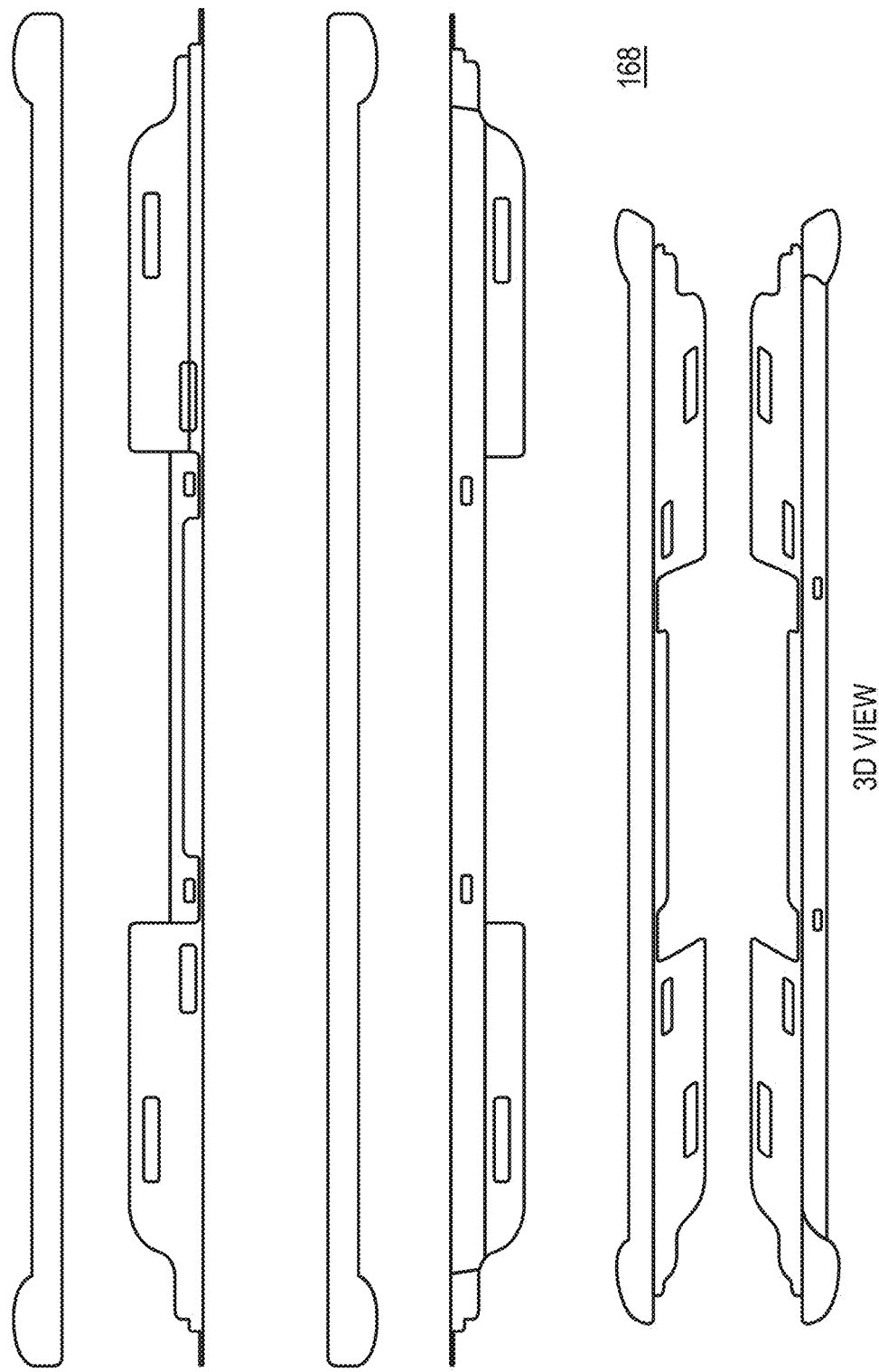
FIG. 40 is a mechanical drawing of the hanging bracket.

Referring again to the rear view of the lighting system 150 in FIG. 34, there can also be seen a hanging bracket 168 and mating clips 170, 172 secured to the frame 164. FIG. 39 is a photo of a perspective view of the hanging bracket 168 and FIG. 40 is a mechanical drawing of the hanging bracket 168. The hanging bracket 168 in combination with the clips are used to secure the hanging bracket 168 to the frame 164 and to secure the frame 164 and the lighting system 150 to a casing for the frame (not illustrated) that houses the overall lighting system 150. In particular the hanging bracket 168 and clips 170, 172 mate together to allow the hanging bracket 168 to easily be connected and disconnected from the clips 170, 172 at both ends of the frame 164 of lighting system to allow for easy installation and wiring of the overall lighting system 150. In particular, the hanging bracket 168 and clips 170, 172 allow for one or both ends of the lighting system to easily be connected and disconnected from the casing for the frame (not illustrated) that houses the overall lighting system 150. With this arrangement, for example, one end of the lighting system can be disconnected from the casing while the other end of the frame remains connected to the casing so as to allow the disconnected end of the lighting system 150 to easily be pivoted downwards to hang freely while the other end of the lighting system 150 remains connected to the casing. This arrangement of the hanging brackets thus allows for easy installation and wiring of the overall lighting system 150 without having to hold the overall lighting system while wiring or installing it.

Figure 41:
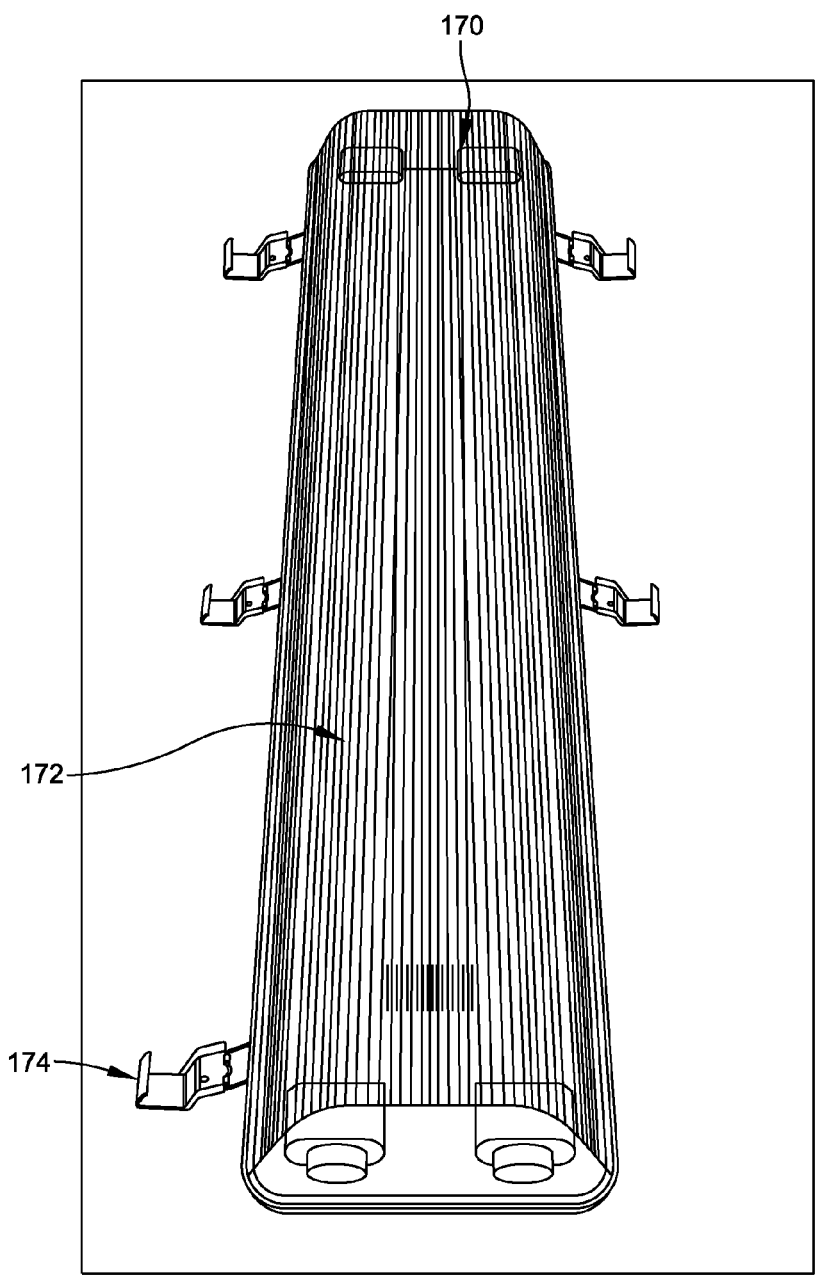
FIG. 41 illustrates a third embodiment of a lighting system according to this disclosure.
Figure 42:
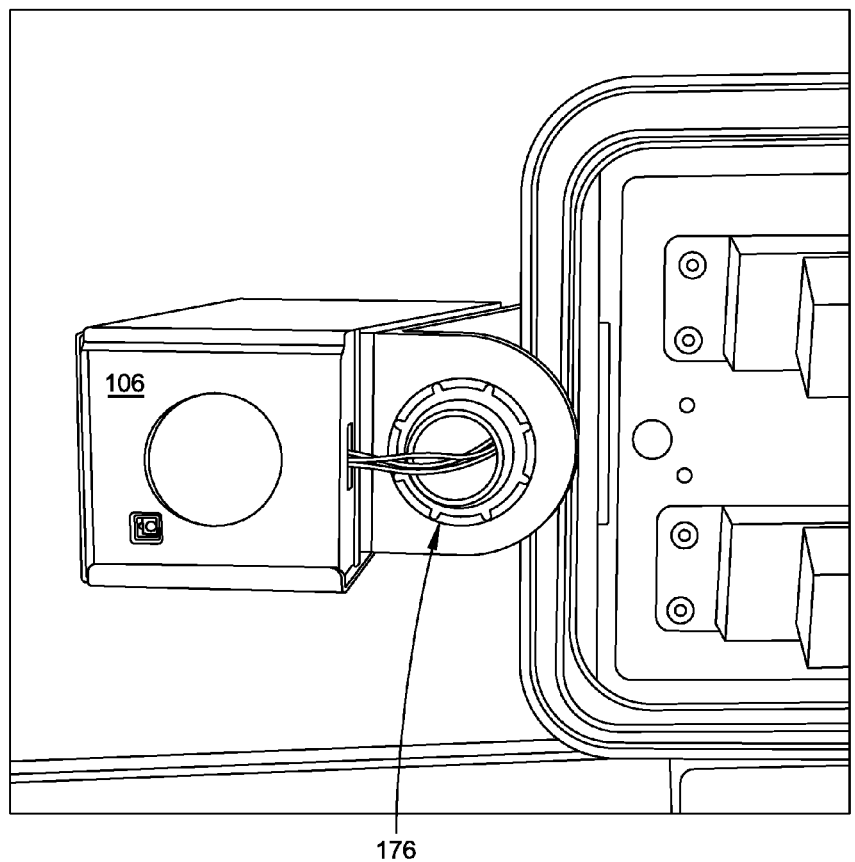
FIG. 42 illustrates a holding structure for holding sensors and for providing a conduit for coupling the sensors to the controller of the power supply module for this third embodiment.
Figure 43:
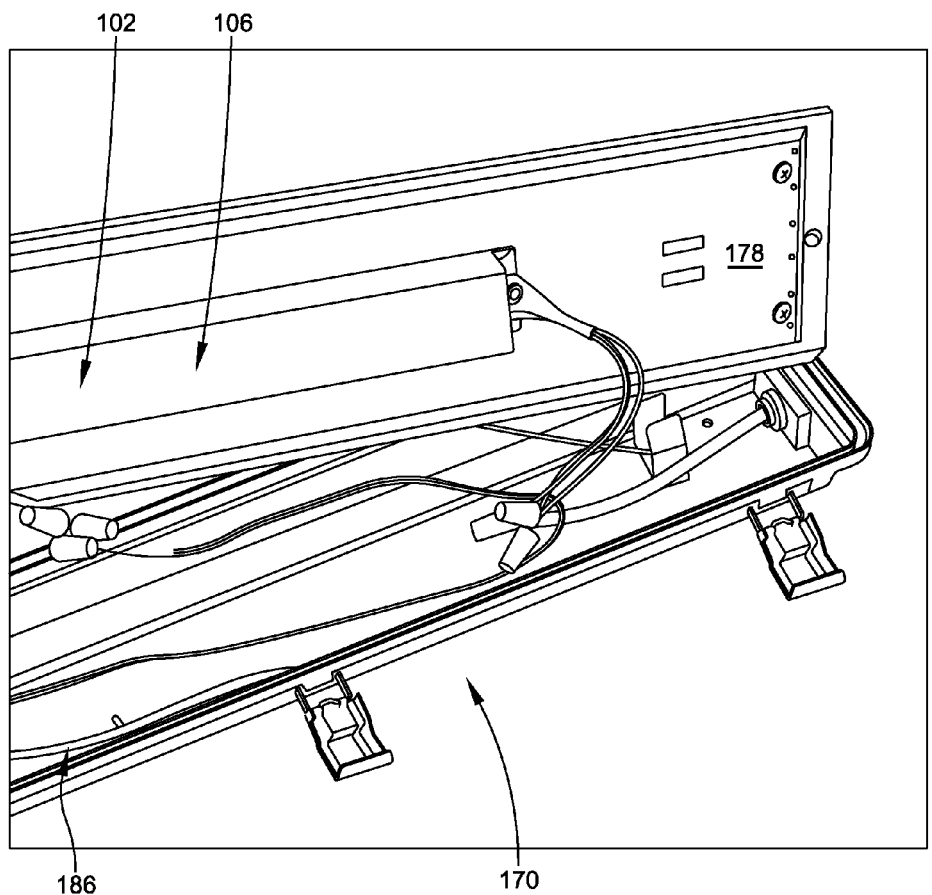
FIG. 43 illustrates a power supply module housed within the lighting system on a back side of a base plate that secures the light assemblies of this third embodiment.
Figure 44:
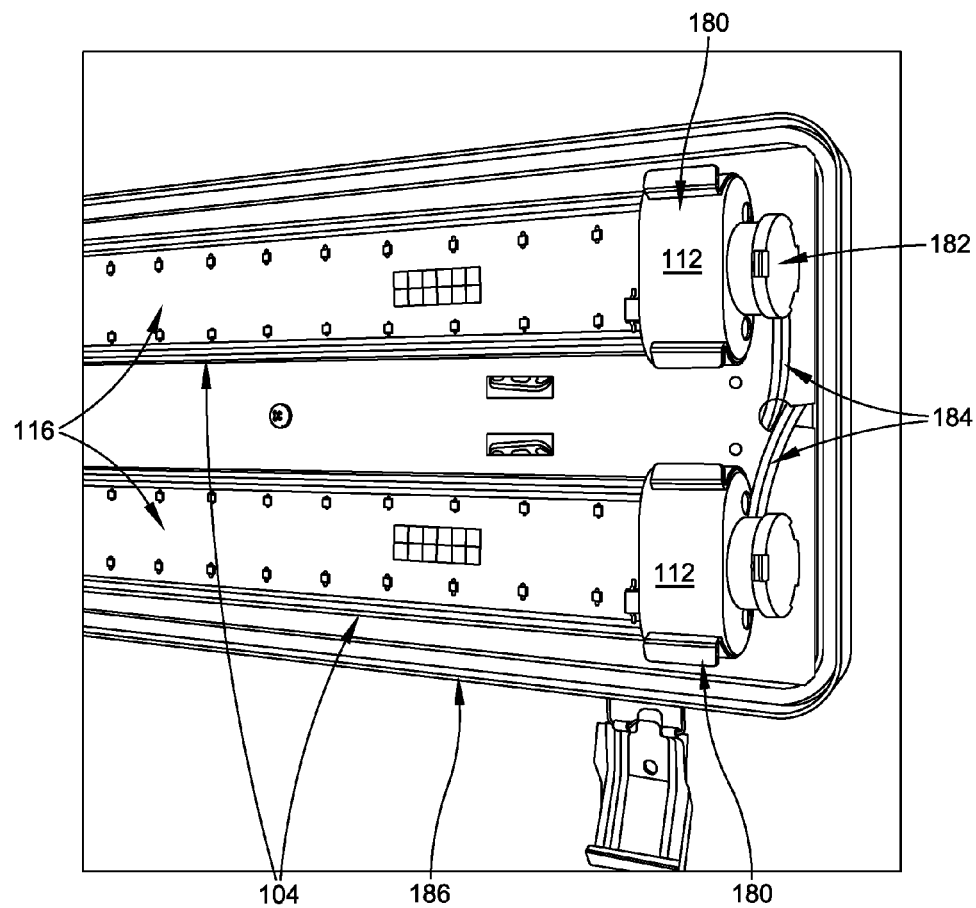
FIG. 44 is an exploded view of a front view of a portion of the lighting system without its cover showing a portion of the two light assemblies secured to the base plate by rounded snap brackets of this third embodiment.
Figure 45:
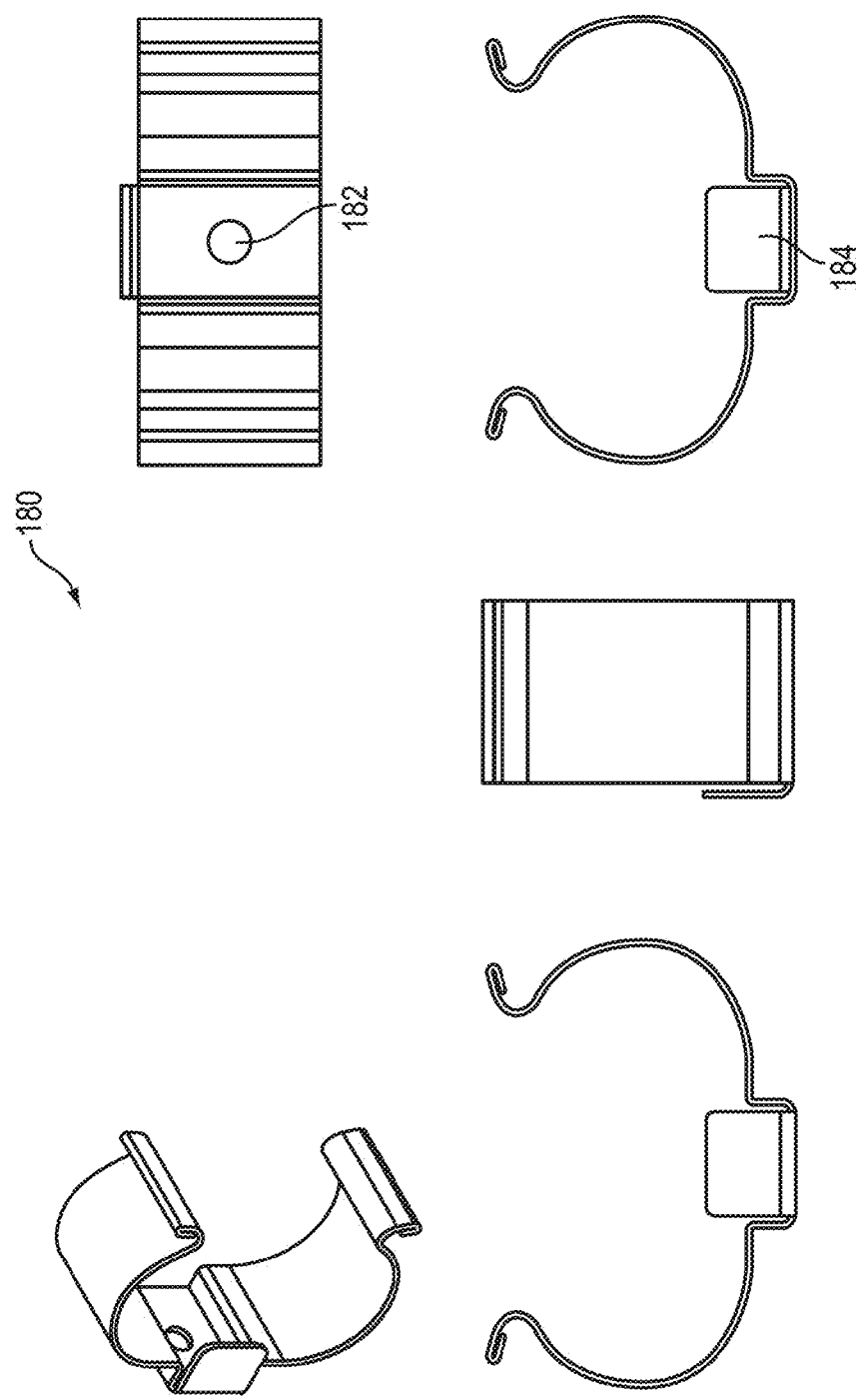
FIG. 45 is a mechanical drawing of a perspective view, side view and bottom view of the rounded snap brackets for this third embodiment.
Figure 46:
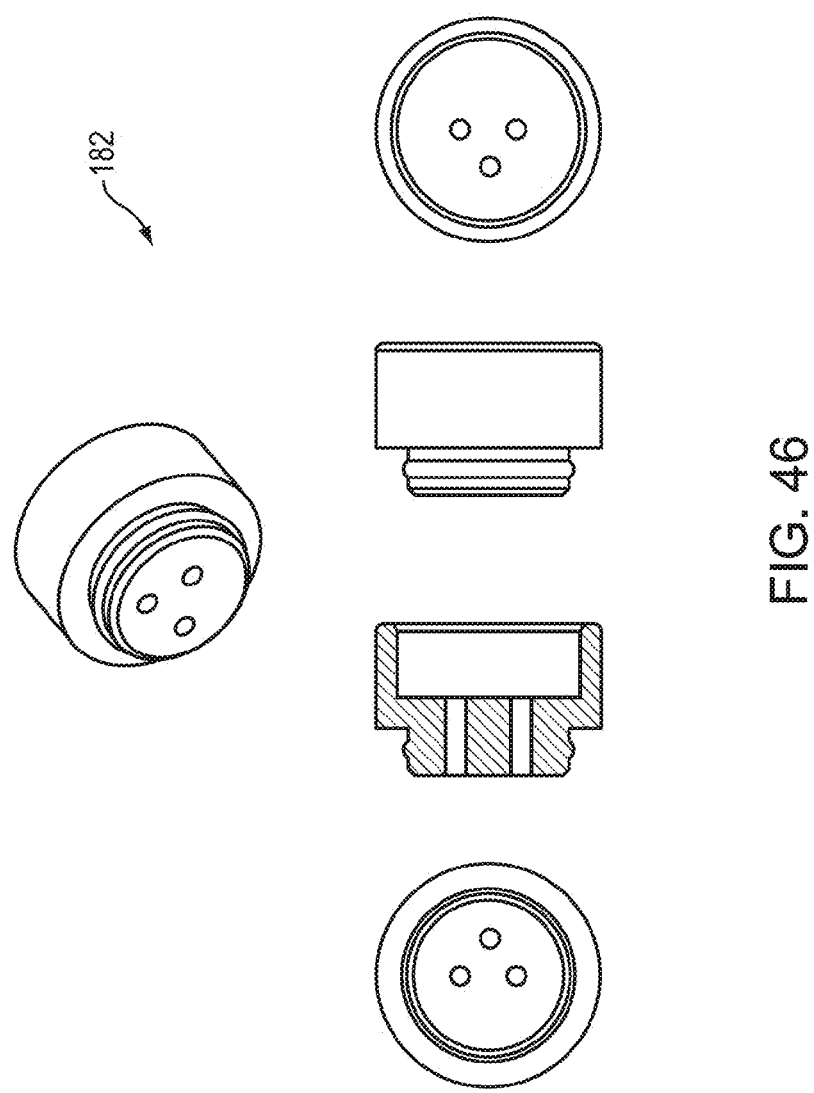
FIG. 46 shows a perspective view, end view and schematic view of a connector used to connect lighting assembly to the power supply module of this third embodiment.

FIG. 41 is a photo of a perspective view of another embodiment of a lighting system 170 according to this disclosure. This embodiment of the lighting system includes two light assemblies 104 (without a cover 116 over the individual light assemblies 104), and a cover 172 over the combination of both light assemblies 104. FIG. 41 illustrates an embodiment of the cover 172 that covers the individual light assemblies 104, which has corrugations along the length of the cover much the same as previously shown in FIG. 2 and FIG. 33. In particular, similar to the cover 116 and the cover 154, the cover 172 can have corrugations running along the length of the cover that help to disburse the light in a direction along the width of the cover 172 and along the width of the lighting system 170. According to this embodiment, the cover 172 is held in place by clips 174 and corresponding mating base of the clips which are secured to a base 186 (See in FIG. 43) of the lighting system 170. Referring to FIG. 42, this embodiment of the lighting system 170 can also optionally include a holding structure 176 for holding sensors 106 and providing a conduit for coupling the sensor 106 (as illustrated in other embodiments) to the controller 108 of the power supply module 102. In particular, as can be seen in FIG. 43 the lighting system 170 includes the power supply module 102 housing the micro controller 108, and the multiple position switch 110, which can all be provided on a back side of the frame 178 for holding the light assemblies 104 and which can be housed within the base 186 of the overall lighting system 170. Referring to FIG. 43, the power supply module 106 can be housed within the lighting system 170, for example, on a back side of a base plate 178 that secures the lighting assemblies 104. FIG. 44 is an exploded view of a front view of a portion of the lighting system 170 without its cover 172, showing a portion of the two light assemblies 104 secured to the base plate 178 by rounded snap brackets 180. Referring to FIG. 45, there is illustrated a mechanical drawing of a perspective view, side view and bottom view of the rounded snap brackets 180, which can be secured to the base plate 178 through an aperture 182 in the rounded snap bracket with hardware 184. It is appreciated that hardware 184 can be a screw, a rivet, a plug, a clip, an insert or any other form of hardware typically used to secure a bracket to a plate. The lighting assemblies 104 are shown with end caps 112, which have been discussed with respect to other embodiments herein, and which provide for electrically connecting the lighting assemblies 104 to the power supply module 102 through end caps 112. According to this embodiment, wires 184 run through the connectors 182 to connect the light assemblies 104 to the power supply module 102. FIG. 46 shows a perspective view, end view and schematic view of the connector 182 that is used to connect lighting assembly 104 to the power supply module 102. It is to be appreciated that the embodiments of the lighting assemblies 104 shown in FIG. 44 have covers 116 covering the base 118 and board 120 (as illustrated in other embodiments herein). However it should be appreciated that the covers 116 are not necessary and preferably are not used simultaneously with cover 172. It should also be appreciated that cover 172 is optional and may not be used in certain installations where weather is not a factor, such as for example parking garages.

Various alterations, modifications, and improvements can be made to the lighting system of this disclosure. By way of example, referring to the schematic diagram of FIG. 1, the power supply module 102 can includes the microcontroller 108 and the switch 110, or the multi-position switch 110 can be separate from the power supply 102. In addition, it is to be appreciated that the switch can be, for example, an electronically controlled switch, or a mechanical DIP switch. Further, it is to be understood the LED chips 122 can be all one color, such as white or other wavelength bands such as red, or can be different colors, such as for example, red and white interleaved so as to provide for red or white overhead light. Further, it is to be appreciated that additional LED chips of a different color, such as red, can be provided, where the LED chips of the multi-layer board 120 disclosed are all white, so as to provide a multi-color LED light bulb 104.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. An LED based lighting system, comprising:
   at least one light assembly comprising a plurality of LED chips;
   a controller configured to receive an input signal and to provide an output control signal for controlling a light level provided by the at least one light assembly;
   a power supply module configured to receive a standard voltage and current signal, to convert the standard voltage and current signal to a DC voltage signal for powering the controller and to provide a power signal to a driver for powering the at least one light assembly to provide the light level in response to the control signal;
   a device implementing a multi-setting switch that provides an output signal for each setting; and
   an ambient light sensor that senses an amount of ambient light and provides an ambient light sensor output signal as a function of an amount of sensed ambient light;
   wherein the controller is responsive to the ambient light sensor output signal and is configured to provide the output control signal to the power supply module to control a respective maximum light level provided by the at least one light assembly in response to each setting of the multi-setting switch; and
   wherein the controller is also responsive to the ambient light sensor output signal and is configured to compare the ambient light sensor output signal corresponding to an amount of sensed ambient light with a plurality of threshold levels and to provide the output control signal to reduce the light level provided by the at least one light assembly from the maximum light level by a plurality of steps down in the light level from the respective maximum light level in response to the amount of sensed ambient light compared to the plurality of threshold levels.

2. The LED based lighting system of claim 1, further comprising a motion sensor that senses motion and provides a motion sensor output signal; and
   wherein the controller is also responsive to the motion sensor output signal and is configured to provide the control signal to control the light level provided by the at least one light assembly in response to sensed motion.

3. The LED based lighting system of claim 1, wherein the at least one light assembly is sized and configured to be replacement for a standard fluorescent light bulb.

4. The LED based lighting system of claim 1, wherein the at least one light assembly comprises a circuit board housing a plurality of LED chips arranged in at least one row, wherein the circuit board is configured so as to dispose the plurality of LED chips in a spaced apart relationship so as to keep the LED chips below a maximum operating temperature.

5. The LED based lighting system of claim 4, wherein the circuit board is laid out so to keep the chips below a temperature of 41 C.

6. The LED based lighting system of claim 4, wherein the at least one light assembly is further comprises a base having a plurality of arms that define slots along the length of the base to receive and to hold the lengthwise ends of the circuit board.

7. The LED based lighting system of claim 3, wherein the at least one light assembly further comprises at least one end cap that comprises two connectors that are configured and arranged to mate with a standard fluorescent light bulb fixture.

8. The LED based lighting system of claim 7, further comprising an overdraft protection circuit that limits peak amount of current that can be provided between the two pins of the end cap.

9. The LED based lighting system of claim 1, wherein the power supply comprises a stable voltage and current maintenance circuit that limits the maximum current and voltage to be provided to the at last one light assembly so that if one or more LED chips fail a constant current is maintained to a remainder of the LED chips.

10. The LED based lighting system of claim 1, wherein the at least one light assembly further comprises a cover having ridges running along a length of the cover so as to disperse the light provided by the plurality of LED chips along a width of the cover and the light assembly.

11. The LED based lighting system of claim 1, wherein the lighting system is sized and arranged to be a replacement for a standard overhead fluorescent light fixture.

12. The LED based lighting system of claim 11, wherein the lighting system comprises at least two light assemblies.

13. The LED based lighting system of claim 12, further comprising a cover that covers that at least two light assemblies, wherein the cover has ridges running along a length of the cover so as to disperse the light provided by at least two light assemblies along a width of the cover and along a width of the lighting system.

14. The LED based lighting system of claim 13, further comprising two rods that maintain the cover in place over the by at least two light assemblies.

15. The LED based lighting system of claim 14, further comprising a reflective background having ridges to reflect the light provided by the at least two light assemblies.

16. The LED based lighting system of claim 13, further comprising:
- a frame for the lighting system having a plurality of slots in two ends of the frame; and
- a plurality of bracket pins, each bracket pin being shaped and arranged to be pushed through corresponding slots in the frame and into an end of a base of the light assembly.

17. The LED based lighting system of claim 13, further comprising a respective hanging bracket and two clips for each of the two ends of the frame of the lighting system that are constructed and arranged to allow for easy installation and removal of each end of the frame of the lighting system from a casing for the lighting system.

18. The LED based lighting system of claim 13, further comprising a plurality of clamps that maintain the cover to a base of the lighting system.

* * * * *